United States Patent [19]
Naito et al.

[11] Patent Number: 5,115,332
[45] Date of Patent: May 19, 1992

[54] RECEIVER FOR COHERENT OPTICAL COMMUNICATION

[75] Inventors: Takao Naito, Kawasaki; Terumi Chikama, Machida; Shigeki Watanabe, Kawasaki; Tetsuya Kiyonaga, Kawasaki; Yoshihito Onoda, Kawasaki; Hideo Kuwahara, Kawasaki, all of Japan

[73] Assignee: Fujitsu Limited, Kawasaki, Japan

[21] Appl. No.: 553,744

[22] Filed: Jul. 18, 1990

[30] Foreign Application Priority Data

Jul. 20, 1989 [JP] Japan ............................ 1-185906
Aug. 11, 1989 [JP] Japan ............................ 1-206635

[51] Int. Cl.⁵ .............................................. H04B 10/06
[52] U.S. Cl. ................................ 359/189; 359/192
[58] Field of Search ............... 455/616, 619, 617; 370/2; 359/189, 190, 191, 192; 375/100

[56] References Cited

U.S. PATENT DOCUMENTS

| | | | |
|---|---|---|---|
| 4,718,120 | 1/1988 | Tzeng | 455/616 |
| 4,723,316 | 2/1988 | Glance | 455/619 |
| 4,723,317 | 2/1988 | Glance | 455/619 |
| 4,888,817 | 12/1989 | Ryu et al. | 455/619 |
| 4,972,515 | 11/1990 | Shibutani | 455/616 |

Primary Examiner—Reinhard J. Eisenzopf
Assistant Examiner—Kinfe-Michael Negash
Attorney, Agent, or Firm—Staas & Halsey

[57] ABSTRACT

A receiver for coherent optical communication in a phase diversity system. An optical hybrid circuit receives a signal beam and receives a local-oscillator beam which has a predetermined phase shift. The optical hybrid circuit branches each beam into pairs, each pair having one signal beam and one local-oscillator beam. These beam pairs are output to first and second photodetectors which each apply a photoelectric conversion, thus producing first and second output signals. The output signals are output to an electrical 90° hybrid circuit which shifts the first signal by 90° and adds it to the second signal to produce a first output signal, and shifts the second signal by 90° and adds it to the first signal to produce a second output signal. The first and second output signals are applied to first and second demodulators, respectively, which delay the signals by a delay corresponding to their frequency. The demodulators output the delayed signals to an adder which adds the two signals to produce an output signal. As a result, the receiver is capable of compensating the wavelength dispension is an optical fiber to secure an enhanced receiving sensitivity.

35 Claims, 12 Drawing Sheets

FIG. I

FIG. 10A
FIG. 10B
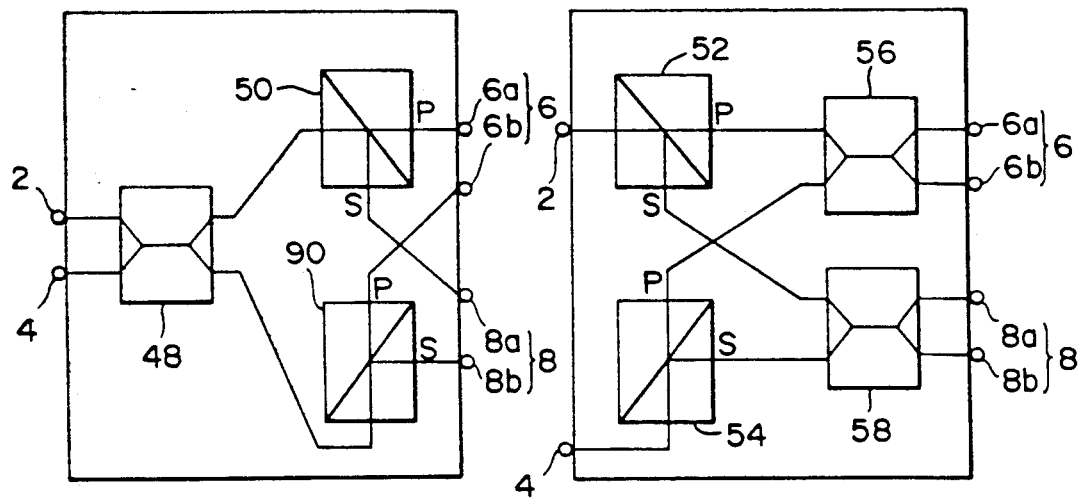
FIG. 10C
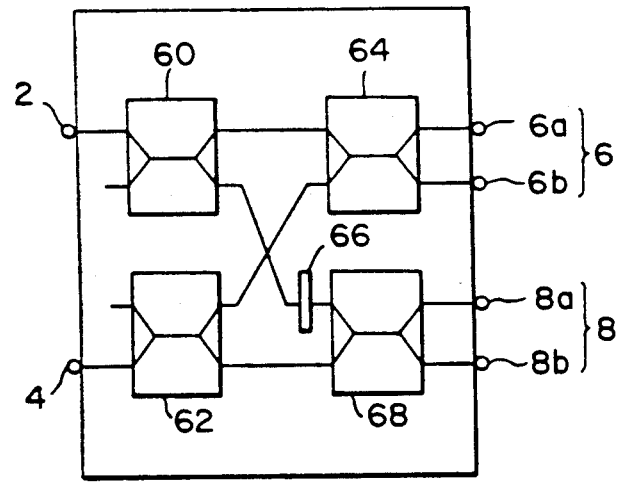

$f_L < f_s$ $f_s < f_L$

RECEIVER FOR COHERENT OPTICAL COMMUNICATION

BACKGROUND OF THE INVENTION

The present invention relates to a receiver for coherent optical communication and, more specifically, to improvements in a phase diversity receiver for coherent optical communication.

The coherent optical communication system is suitable for long-distance signal transmission because its receiving sensitivity is higher than the current, practical intensity modulation direct detection system, and is suitable for bulk transmission owing to its capability of high-density multiplexing in transmitting signals using electromagnetic waves of frequencies in the frequency range of near visible light. The heterodyne system, the homodyne system and the phase diversity system are generally known as receiving systems for coherent optical communication. The phase diversity system, in particular, is suitable for high-speed transmission because the band width for the light wave detector (photoelectric converter) is half that for the photodetector of the heterodyne system. The phase diversity system, as compared with the homodyne system, is suitable for practical application because the phase diversity system does not require a light source with a very narrow spectral line width for emitting a carrier beam and a local-oscillator beam and does not need any phase locking circuit. However, whereas the heterodyne system is capable of compensating chromatic dispersion (group delay) in the optical fiber in the IF band (the intermediate frequency band), the homodyne system or the phase diversity system, which obtains signals directly in the baseband, is unable, in general, to compensate dispersion easily because the upper sideband and the lower sideband are folded. Accordingly, the phase diversity system needs improvements to enable the phase diversity system to compensate dispersion easily.

The heterodyne system mixes a received signal beam and a local-oscillator beam by the square-law function of the photodetector to produce an IF signal having a frequency, for example, a frequency in the microwave frequency range, corresponding to the difference between the frequency of the signal beam and that of the local-oscillator beam and demodulates the IF signal. In the heterodyne system, as well as in the foregoing other systems, the photodetector provides an IF signal having an amplitude proportional to the product of the amplitude of the received signal beam and that of the local-oscillator beam and, therefore, signals can be received at a high sensitivity by using a local-oscillator beam of an appropriate intensity. However, in the heterodyne system, a band for the photodetector is in the range of 0.5 B to 2.5 B when the intermediate frequency $f_{IF}$ is, for example, 1.5 times the bit rate B. Accordingly, when the bit rate is 10 Gb/s, the frequency band must be from 5 GHz to 25 GHz. Since it is difficult to provide a photodetector having a flat frequency response characteristic and a satisfactory noise characteristic in such a frequency band, the heterodyne system is not necessarily suitable for high-speed transmission. However, since the heterodyne system is able to achieve demodulation through envelope detection or the like, requirement of the light source relating to spectral line width is not very severe. Furthermore, in the heterodyne system, the upper sideband and lower sideband by modulation in an IF signal spectrum are not folded, the dispersion in an optical fiber can be compensated by using an equalizer employing a strip line.

In the homodyne system, the phase of the local-oscillator beam is controlled so that the carrier of the received signal beam and the local-oscillator beam are synchronized and a baseband signal is obtained directly without using an IF signal. Accordingly, similarly to the condition with the intensity-modulated direct detection system, the bit rate B satisfies a desired band for the photodetector. Accordingly, the homodyne system is suitable for high-speed transmission. However, the homodyne system needs an optical phase synchronizing loop and a light source with a very small spectral line width. Moreover, since the upper sideband and lower sideband of the signal are folded on the baseband, the homodyne system is unable to compensate dispersion by an equalizer, which is different from the heterodyne system.

In the phase diversity system, in general, a local-oscillator beam of a frequency slightly different from that of the carrier of the received signal beam is used. The received signal beam is mixed with the branched local-oscillator beam having a predetermined phase shift, for example, 90°, for modulation. Since the band for the photodetector of the phase diversity system may be substantially equal to that for the homodyne system, the phase diversity system is able to construct a high-speed system. The phase diversity system does not need the phase control of the local-oscillator beam, and hence does not need any light source capable of emitting light having a spectrum of very small spectral line width. However, the phase diversity system, similarly to the homodyne system, is unable to compensate chromatic dispersion in an optical fiber easily because the upper and lower sidebands are folded on the baseband.

SUMMARY OF THE INVENTION

Accordingly, it is an object of the present invention to provide a receiver for coherent optical communication, suitable for high-speed transmission, not requiring strict conditions for the spectral line width of light emitted by the light source and capable of compensating chromatic dispersion in an optical fiber. To put it briefly, it is an object of the present invention to enable a receiver for phase diversity system to compensate chromatic dispersion in an optical fiber.

In a first aspect of the present invention, a receiver for coherent optical communication includes: an optical local oscillator for emitting a local-oscillator beam. An optical hybrid circuit 10 which is provided with a first optical input port for receiving a signal beam, a second optical input port for receiving the local-oscillator beam, a first optical output port and a second optical output port, branches the signal beam and the local-oscillator beam, adds one pair of the branched beams pair of each of the signal beam and the local-oscillator beam having a predetermined phase shift to the other pair respectively, and applies the added beams respectively to the first optical output port and the second optical output port. A first photodetector is provided for the photoelectric conversion of a beam received from first optical output port, and a second photodetector is provided for the photoelectric conversion of a beam received from the second optical output port. An electrical 90° hybrid circuit which is provided with an electrical input port for receiving the output signal of the first photodetector, a second electrical input port for receiving the output signal of the second photodetector, a first electrical output port and a second electrical output port, adds the signal received at the first electrical input port to the signal received at the second electrical input port after shifting the phase of the former by 90° to obtain an added signal and applies the added signal to the second electrical output port. The electrical 90° hybrid circuit adds the signal received at the second electrical input port to the signal received at the first electrical input port after shifting the phase of the former by 90° to obtain an added signal, and applies the added signal to the first electrical output port. A first equalizer is provided which delays a signal received from the first electrical output port by a delay corresponding to the frequency of the same received signal, and a second equalizer is provided which delays a signal received from the second electrical output port by a delay corresponding to the frequency of the same received signal; a first demodulator which demodulates the output signal of the first equalizer, a second demodulator which demodulates the output signal of the second equalizer; and an adder which adds the respective output signals of the first demodulator and the second demodulator.

Desirably, the proportional constant of either the first equalizer or the second equalizer, for determining the delay according to the frequency is, positive; and the sign of the proportional constant of the other, for determining the delay according to the frequency, is negative.

In a second aspect of the present invention, a receiver for coherent optical communication includes: an optical local oscillator for emitting a local-oscillator beam. An optical hybrid circuit which is provided with a first optical input port for receiving the signal beam, a second optical input port for receiving the local-oscillator beam, a first optical output port and a second optical output port, branches the signal beam and the local-oscillator beam, adds one pair of the branched beams pairs of each of the signal beam and the local-oscillator beam having a predetermined phase shift to the other pair respectively, and applies the added beams respectively to the first optical output port and the second optical output port. A first photodetector is provided for the photoelectric conversion of a beam of the first optical output port, and second photodetector is provided of the photoelectric conversion of a beam of the second optical output port. A first branching circuit is provided for branching the output signal of the first photodetector, and a second branching circuit is provided for branching the output signal of the second photodetector 14. A first electrical 90° hybrid circuit which is provided with a first electrical input port 16 which receives one of the output branched signals of the first branching circuit, a second electrical input port which receives one of the output branched signals of the second branching circuit, a first electrical output port and a second electrical output port, adds the signal applied to the first electrical input port to the signal applied to the second electrical input port after shifting the phase of the former by 90° to provide an added signal, applies the same added signal to the second electrical output port, adds the signal applied to the second electrical input port to the signal applied to the first electrical input port 16 after shifting the phase of the former by 90° to obtain an added signal and applies the same added signal to the first electrical output port. An inverter is provided for inverting the polarity of the other output branched signal of either the first branching circuit or the second branching circuit. A second electrical 90° hybrid circuit which is provided with a first electrical input port for receiving the other output branched signal not applied to the inverter for polarity inversion, a second electrical input port 18 for receiving the other branched signal inverted by the inverter, a first electrical output port and a second electrical output port, adds the signal applied to the first electrical input port to the signal applied to the second electrical input port after shifting the phase of the former by 90° to provide an added signal, applies the same added signal to the second electrical output port, adds the signal applied to the second electrical input port to the signal applied to the first electrical input port after shifting the phase of the former by 90° to provide an added signal and applies the same added signal to the first electrical output port. A first equalizer and a second equalizer are provided which delay a signal received from the first electrical output port of the first electrical 90° hybrid circuit and a signal received from the second electrical output port of the second electrical 90° hybrid circuit by delays corresponding to their frequencies, respectively, or delay a signal received from the second electrical output port of the first electrical 90° hybrid circuit and a signal received from the first electrical output port of the second electrical 90° hybrid circuit by delays corresponding to their frequencies, respectively. A first demodulator is provided for demodulating the output signal of the first equalizer, and a second demodulator is provided for demodulating the output signal of the second equalizer. Finally an adder is provided for adding the output signals of the first demodulator and the second demodulator.

Desirably, the equalizers are the same in the sign of the ratio of change in delay to change in frequency. Accordingly, it is not necessary to use two kinds of equalizers differing from each other in characteristics.

In a third aspect of the present invention, a receiver for coherent optical communication includes: a first optical branching circuit for branching a received signal beam, a local optical oscillator which emits a local-oscillator beam, and a second optical branching circuit which branches the local-oscillator beam emitted by the local optical oscillator. A first optical hybrid circuit which is provided with a first optical input port which receives one of the branched beams of the signal beam branched by the first optical branching circuit, a second optical input port which receives one of the branched beams of the local-oscillator beam branched by the second optical branching circuit first optical output port and a second optical output port, branches the signal beam and the local-oscillator beam, adds one pair of the branched beams pair of each of the signal beam and the local-oscillator beam having a predetermined phase shift to the other pair respectively, and applies the added beams to the first optical output port and the second optical output port, respectively. A second optical hybrid circuit which is provided with a first optical input port which receives the other branched beam of the signal beam branched by the first optical branching circuit, a second optical input port which receives the other branched beam of the local-oscillator beam branched by the second optical branching circuit, a first optical output port and a second optical output port, branches the signal beam and the local-oscillator beam, adds one pair of the branched beams pairs of each of the signal beam and the local-oscillator beam having a predetermined phase shift to the pair respectively, and applies the added beams to the first optical output port and the second optical output port, respectively. First to fourth photodetectors are provided for the photoelectric conversion of beams received from the first optical output port 6 and second output port of the first optical hybrid circuit and the first optical output port and second optical output port of the second optical hybrid circuit. A first electrical 90° hybrid circuit which is provided with a first electrical input port which receives the output signal of the first photodetector, a second electrical input port which receives the output signal of the second photodetector, a first electrical output port and a second electrical output port, adds the input signal applied to the first electrical input port to the input signal applied to the second electric input port 18 after shifting the phase of the former by 90° to provide an added signal, applies the same added signal to the second electrical output port, adds the input signal applied to the second electrical input port to the input signal applied to the first input port after shifting the phase of the former by 90° to provide an added signal and applies the same added signal to the first electrical output port; a second electrical 90° hybrid circuit which is provided with a first electrical input port which receives the output signal of the third photodetector, a second electrical input port which receives the output signal of the fourth photodetector, a first electrical output port and a second electrical output port, adds the signal applied to the first electrical input port to the signal applied to the second electrical input port after shifting the phase of the former by 90°, applies the added signal to the second electrical output port, adds the signal applied to the second electrical input port to the signal applied to the first electrical input port after shifting the phase of the former by 90° and applies the added signal to the first electrical output port; a first equalizer and a second equalizer which delay the output signals received from the first electrical output port of the first electrical 90° hybrid circuit and the second electrical output port of the second electrical 90° hybrid circuit by delays respectively corresponding to their frequencies, or delay the output signals received from the second electrical output port of the first electrical 90° hybrid circuit and the output signal of the first electrical output port of the second electrical 90° hybrid circuit by delays respectively corresponding to their frequencies. A first demodulator is provided for demodulating the output signal of the first equalizer, and a second demodulator is provided for demodulating the output signal of the second equalizer; and an adder for adding the output signals of the first demodulator and the second demodulator.

Desirably, the first equalizer and the second equalizer are the same in the sign of the ratio of change in delay to change in frequency.

In any one of the receivers in the first, the second and the third aspect of the present invention, the electrical 90° hybrid circuit provides separately a signal based on the upper sideband and a signal based on the lower sideband folded on the baseband, so that the compensation of wavelength dispersion in an optical fiber can be achieved.

A receiver for coherent optical communication in a fourth aspect of the present invention includes a local oscillator which emits a local-oscillator beam. An optical hybrid circuit which is provided with a first optical input port for receiving the received signal beam, a second optical input port for receiving the local-oscillator beam, a first optical output port and a second optical output port, branches the received signal beam and the local-oscillator beam, adds one pair of the branched signal beams pairs of each of the signal beam and the local-oscillator beam having a predetermined phase shift to the other pair, respectively, and applies the added beams respectively to the first and second optical output ports. A first photodetector is provided for the photoelectric conversion of a beam of the first optical output port, and a second photodetector is provided for the photoelectric conversion of the output signal of the second optical output port. An oscillator is provided which generates a signal of a fixed frequency, a first mixer is provided which adds the signal generated by the oscillator with the output signal of the first photodetector, and a second mixer which adds the signal generated by the oscillator with the output signal of the second photodetector. An electrical 90° hybrid circuit which is provided with a first electrical input port for receiving the output signal of the first mixer, a second electrical input port for receiving the output signal of the second mixer, a first electrical output port and a second electrical output port, adds the signal applied to the first electrical input port to the signal applied to the second electrical input port after shifting the phase of the former by 90°, applies the added signal to the second electrical output port, adds the input signal applied to the second electrical input port to the input signal applied to the first electrical input port after shifting the phase of the former by 90° and applies the added signal to the first electrical output port. Finally an equalizer is provided which delays the output signal of the first or second electrical output port by a delay corresponding to its frequency.

This receiver up-converts a baseband signal again to a signal in the IF band. Thus, the receiver, similarly to the heterodyne receiver, executes demodulation again after compensating dispersion in an optical fiber to obtain a signal in the baseband.

The above and other objects, features and advantages of the present invention and the manner of realizing them will become more apparent, and the invention itself will best be understood, from a study of the following description and appended claims, with reference had to the attached drawings showing receivers in preferred embodiments of the invention.

BRIEF DESCRIPTION OF THE DRAWINGS

FIGS. 10A, 10B and 10C are circuit diagrams of optical hybrid circuits suitable for a double-balanced photodetector;

DETAILED DESCRIPTION OF THE PREFERRED EMBODIMENTS

Figure 1:
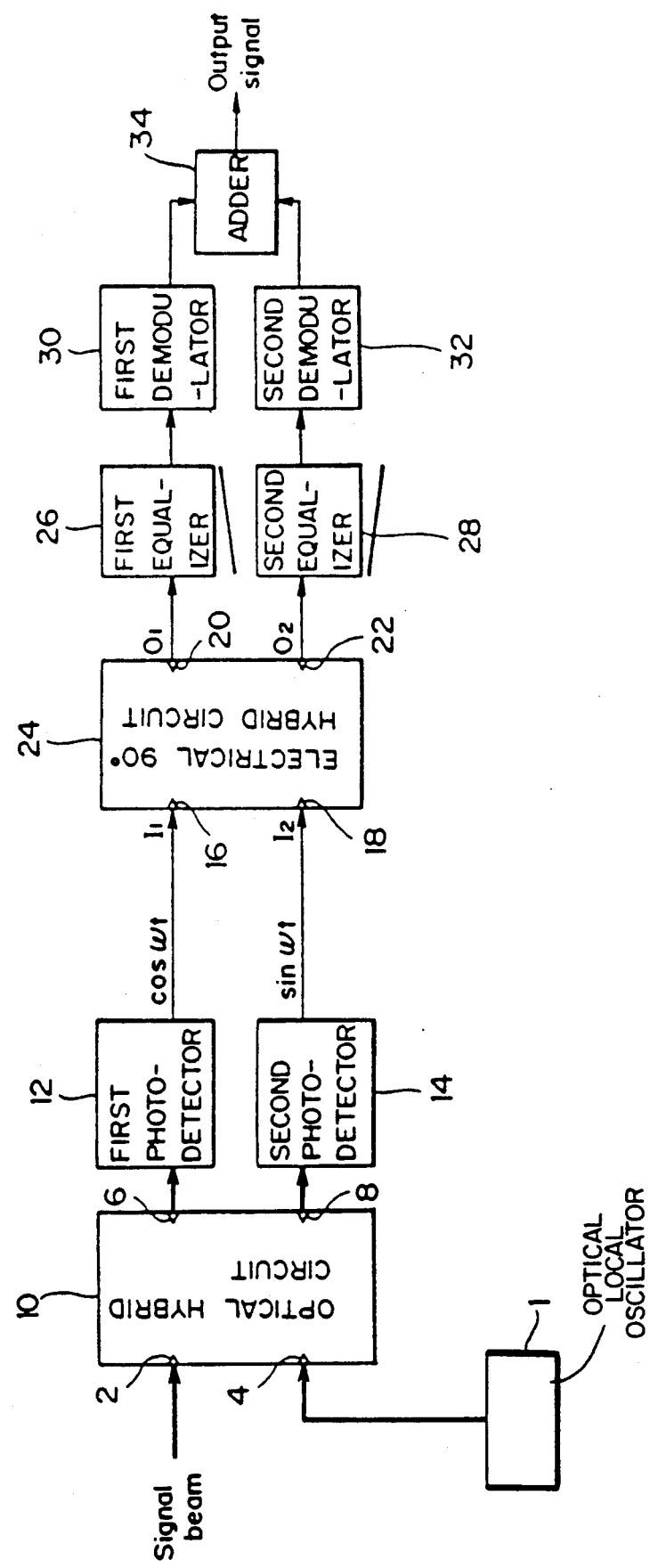
FIG. 1 is a block diagram of a receiver in a first embodiment according to the present invention.

As shown in FIG. 1, in a first embodiment of the present invention, a receiver for coherent optical communication comprises: an optical local oscillator 1 for emitting a local-oscillator beam; an optical hybrid circuit 10 which is provided with a first optical input port 2 for receiving a signal beam, a second optical input port 4 for receiving the local-oscillator beam, a first optical output port 6 and a second optical output port 8, branches the signal beam and the local-oscillator beam, adds one pair of the branched beams pairs of each of the signal beam and the local-oscillator beam having a predetermined phase shift to the other pair respectively, and applies the added beams respectively to the first optical output port 6 and the second optical output port 8; a first photodetector 12 for the photoelectric conversion of a beam received from first optical output port 6; a second photodetector 14 for the photoelectric conversion of a beam received from the second optical output port 8; an electrical 90° hybrid circuit 24 which is provided with an electrical input port 16 for receiving the output signal of the first photodetector 12, a second photodetector 14, a first electrical output port 20 and a second electrical output port 22, adds the signal received at the first electrical input port 16 to the signal received at the second electrical input port 18 after shifting the phase of the former by 90° to obtain an added signal and applies the added signal to the second electrical output port 22, adds the signal received at the second electrical input port 18 to the signal received at the first electrical input port 16 after shifting the phase of the former by 90° to obtain an added signal and applies the added signal to the first electrical output port 20; a first equalizer 26 which delays a signal received from the first electrical output port 20 by a delay corresponding to the frequency of the same received signal; a second equalizer 28 which delays a signal received from the second electrical output port 22 by a delay corresponding to the frequency of the same received signal; a first demodulator 30 which demodulates the output signal of the first equalizer 26, a second demodulator 32 which demodulates the output signal of the second equalizer 28; and an adder 34 which adds the respective output signals of the first demodulator 30 and the second demodulator 32.

The proportional constant of either the first equalizer 26 or the second equalizer 28, for determining the delay according to the frequency is positive and the sign of the proportional constant or the other, for determining the delay according to the frequency is negative.

Figure 2:
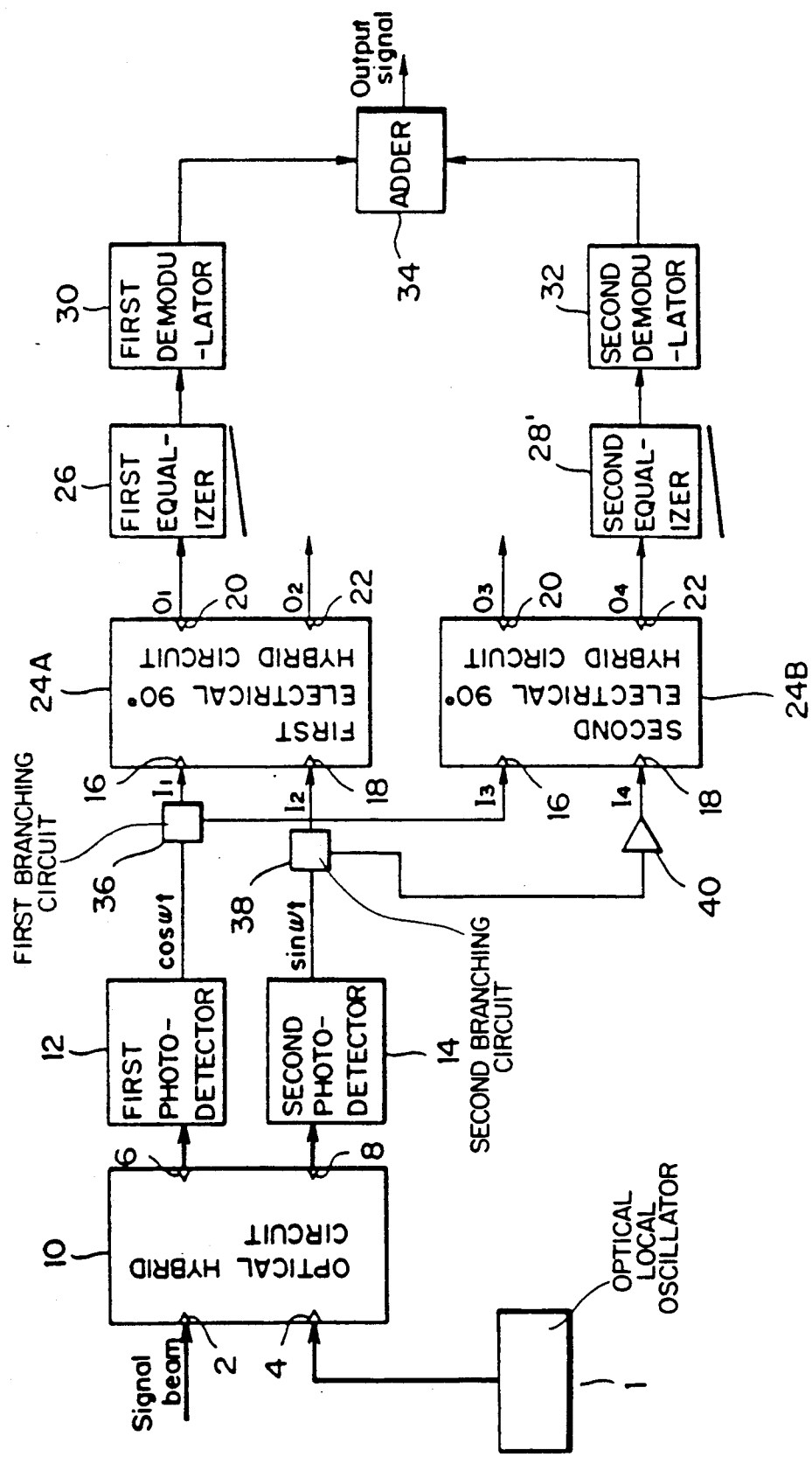
FIG. 2 is a block diagram of a receiver in a second embodiment according to the present invention.

As shown in FIG. 2, in a second embodiment of the present invention, a receiver for coherent optical communication comprises: an optical local oscillator 1 for emitting a local-oscillator beam; an optical hybrid circuit 10 which is provided with a first optical input port 2 for receiving the signal beam, a second optical input port 4 for receiving the local-oscillator beam, a first optical output port 6 and a second optical output port 8, branches the signal beam and the local-oscillator beam, adds one pair of the branched beams pairs of each of the signal beam and the local-oscillator beam having a predetermined phase shift to the other pair respectively, and applies the added beams respectively to the first optical output port 6 and the second optical output port 8; a first photodetector 12 for the photoelectric conversion of a beam of the first optical output port 6; a second photodetector 14 for the photoelectric conversion of a beam of the second optical output port 8; a first branching circuit 36 for branching the output signal of the first photodetector 12; a second branching circuit 38 for branching the output signal of the second photodetector 14; a first electrical 90° hybrid circuit 24A which is provided with a first electrical input port 16 which receives one of the output branched signals of the first branching circuit 36, a second electrical input port 18 which receives one of the output branched signals of the second branching circuit 38, a first electrical output port 20 and a second electrical output port 22, adds the signal applied to the first electrical input port 16 to the signal applied to the second electrical input port 18 after shifting the phase of the former by 90° to provide an added signal, applies the same added signal to the second electrical output port 22, adds the signal applied to the second electrical input port 18 to the signal applied to the first electrical input port 16 after shifting the phase of the former by 90° to obtain an added signal and applies the same added signal to the first electrical output port 20; an inverter 40 for inverting the polarity of the other output branched signal of either the first branching circuit 36 or the second branching circuit 38; a second electrical 90° hybrid circuit 24B which is provided with a first electrical input port 16 for receiving the other output branched signal, not applied to the inverter 40 for polarity inversion, a second electrical input port 18 for receiving the other branched signal inverted by the inverter 40, a first electrical output port 20 and a second electrical output port 22, adds the signal applied to the first electrical input port 16 to the signal applied to the second electrical input port 18 after shifting the phase of the former by 90° to provide an added signal, applies the same added signal to the second electrical output port 22, adds the signal applied to the second electrical input port 18 to the signal applied to the first electrical input port 16 after shifting the phase of the former by 90° to provide an added signal and applies the same added signal to the first electrical output port 20; a first equalizer 26 and a second equalizer 28' which delay a signal received from the first electrical output port 20 of the first electrical 90° hybrid circuit 24a and a signal received from the second electrical output port 22 of the second electrical 90° hybrid circuit 24B by delays corresponding to their frequencies, respectively, or delay a signal received from the second electrical output port 22 of the first electrical 90° hybrid circuit 24a and a signal received from the first demodulator 30 for demodulating the output signal of the first equalizer 26; a second demodulator 32 for demodulating the output signal of the second equalizer 28'; and an adder 34 for adding the output signals of the first demodulator 30 and the second demodulator 32.

The equalizers 26 and 28' are the same in the sign of the ratio of change in delay to change in frequency. Accordingly, it is not necessary to use two kinds of equalizers differing from each other in characteristics.

Figure 3:
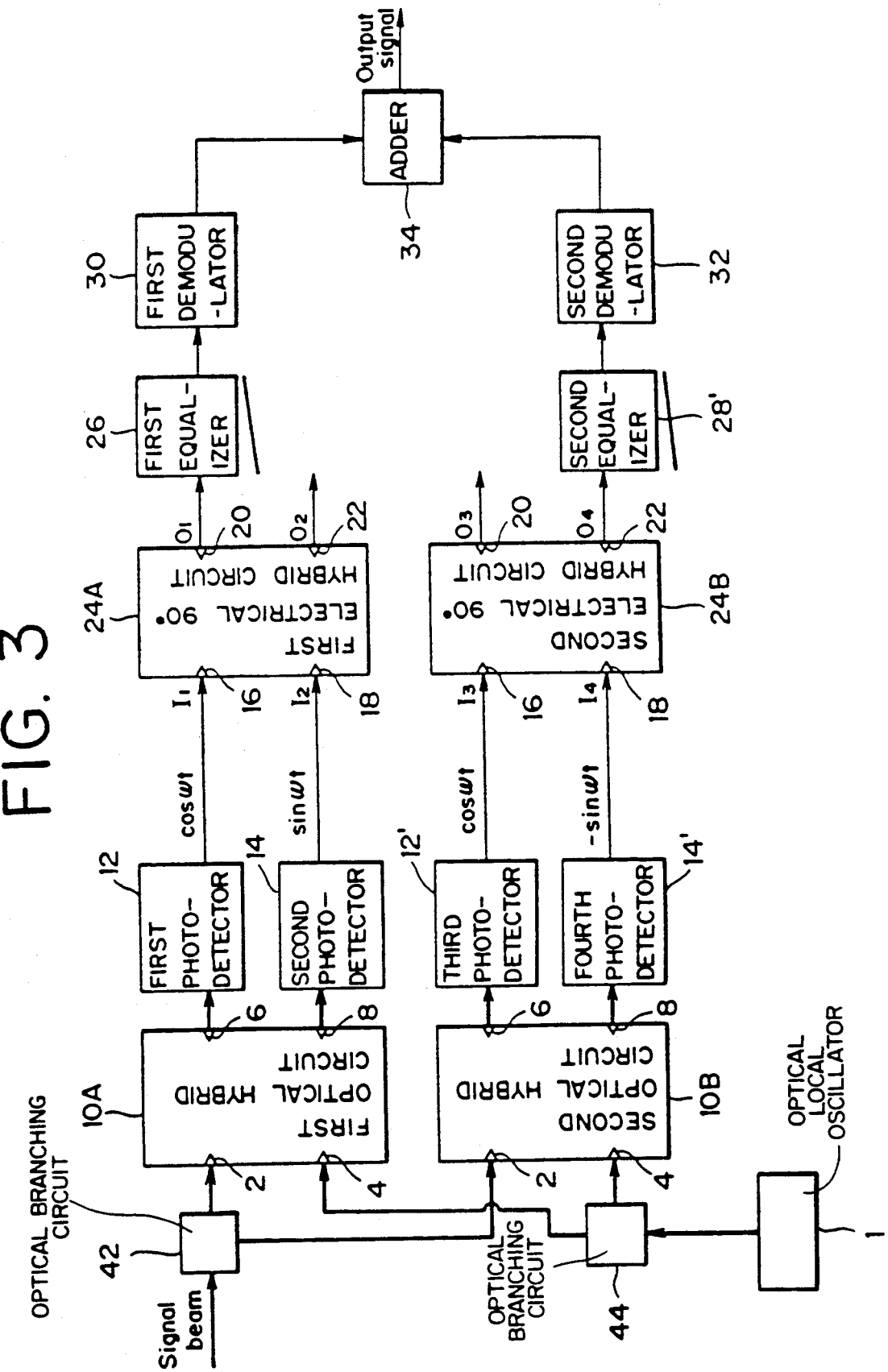
FIG. 3 is a block diagram of a receiver in a third embodiment according to the present invention.

As shown in FIG. 3, in a third embodiment of the present invention, a receiver for coherent optical communication comprises: a first optical branching circuit 42 for branching a received signal beam; a local optical oscillator 1 which emits a local-oscillator beam; a second optical branching circuit 44 which branches the local-oscillator beam emitted by the local optical oscillator 1; a first optical hybrid circuit 10A which is provided with a first optical input port 2 which receives one of the branched beams of the signal beam branched by the first optical branching circuit 42, a second optical input port 4 which receives one of the branched beams of the local-oscillator beam branched by the second optical branching circuit 44, a first optical output port 6 and a second optical output port 8, branches the signal beam and the local-oscillator beam, adds one pair of the branched beams pairs of each of the signal beam and the local-oscillator beam having a predetermined phase shift to the other pair respectively, and applies the added beams to the first optical output port 6 and the second optical output port 8, respectively; a second optical hybrid circuit 10B which is provided with a first optical input port 2 which receives the other branched beam of the signal beam branched by the first optical branching circuit 42, a second optical input port 4 which receives the other branched beam of the local-oscillator beam branched by the second optical branching circuit 44, a first optical output port 6 and a second optical output port 8, branches the signal beam and the local-oscillator beam, adds one pair of the branched beams pairs of each of the signal beam and the local-oscillator beam having a predetermined phase shift to the pair respectively, and applies the added beams to the first optical output port 6 and the second optical output port 8, respectively; first to fourth photodetectors 12, 14, 12' and 14' respectively for the photoelectric conversion of beams received from the first optical output port 6 and second output port 8 of the first optical hybrid circuit 10A and the first optical output port 6 and second optical output port 8 of the second optical hybrid circuit 10B; a first electrical 90° hybrid circuit 24a which is provided with a first electrical input port 16 which receives the output signal of the first photodetector 12, a second electrical input port 18 which receives the output signal of the second photodetector 14, a first electrical output port 20 and a second electrical output port 22, adds the input signal applied to the first electrical input port 18 after shifting the phase of the former by 90° to provide an added signal, applies the same added signal to the second electrical output port 22, adds the input signal applied to the second electrical input port 18 to the input signal applied to the first input port 16 after shifting the phase of the former by 90° to provide an added signal and applies the same added signal to the first electrical output port 20; a second electrical 90° hybrid circuit 24b which is provided with a first electrical input port 16 which receives the output signal of the third photodetector 12', a second electrical input port 18 which receives the output signal of the fourth photodetector 14', a first electrical output port 20 and a second electrical output port 22, adds the signal applied to the first electrical input port 16 to the signal applied to the second electrical input port 18 after shifting the phase of the former by 90°, applies the added signal to the second electrical output port 22, adds the signal applied to the second electrical input port 18 to the signal applied to the first electrical input port 16 after shifting the phase of the former by 90° and applies the added signal to the first electrical output port 20; a first equalizer 26 and a second equalizer 28' which delay the output signals received from the first electrical output port 20 of the first electrical 90° hybrid circuit 24A and the second electrical output port 22 of the second electrical 90° hybrid circuit 24B by delays respectively corresponding to their frequencies, or delay the output signals received from the second electrical output port 22 of the first electrical 90° hybrid circuit 24a and the output signal of the first electrical output port 20 of the second electrical 90° hybrid circuit 24b by delays respectively corresponding to their frequencies; a first demodulator 30 for demodulating the output signal of the first equalizer 26, a second demodulator 32 for demodulating the output signal of the second equalizer 28'; and an adder for adding the output signals of the first demodulator 30 and the second demodulator 32.

The first equalizer 26 and the second equalizer 28' are the same in the sign of the ratio of change in delay to change in frequency.

In any one of the receivers in the first, the second and the third embodiments of the present invention, the electrical 90° hybrid circuit provides separately a signal based on the upper sideband and a signal based on the lower sideband folded on the baseband, so that the compensation of wavelength dispersion in an optical fiber can be achieved.

Prior to the detailed description of receivers operation in preferred embodiments according to the present invention, the circuit configurations of optical hybrid circuits will be described with reference to FIGS. 4A, 4B and 4C.

Figure 4A:
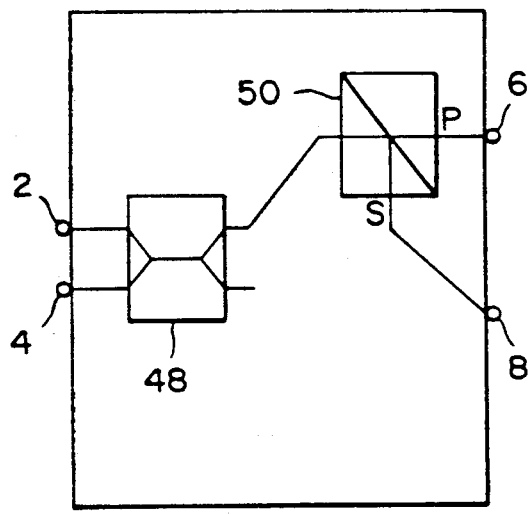
FIGS. 4A, 4B and 4C are circuit diagrams of optical hybrid circuits.

An optical hybrid circuit shown in FIG. 4A comprises an optical coupler 48 which adds the signal beam applied to the first optical input port 2 to the local-oscillator beam applied to the second optical input port 4 to provide an added beam and branches the added beam to provide branched beams, and a polarizing splitter 50 which splits at least one of the branched beams branched by the optical coupler 48 so that the polarized components of the local-oscillator beam and the signal beam are applied to the first optical output port 6 and the second optical output port 8.

Figure 4B:
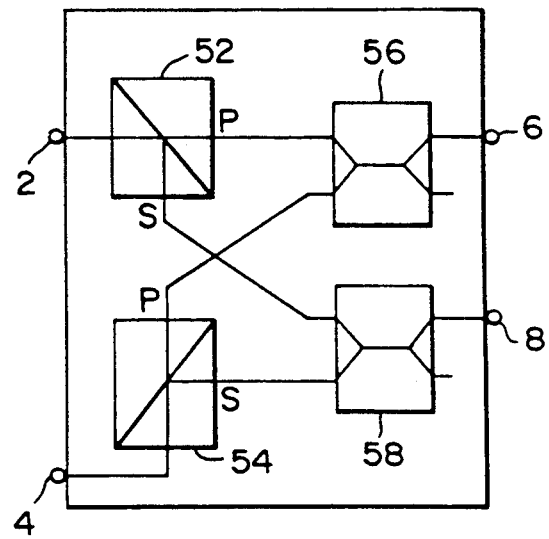

An optical hybrid circuit shown in FIG. 4B comprises a first polarizing splitter 52 and a second polarizing splitter 54 which splits the signal beam received at the first optical input port 2 and the local-oscillator beam received at the second optical input port 4 so that the polarized components of the signal beam and the local-oscillator beam are provided, and two optical couplers 56 and 58 which mix beams having the same plane of polarization provided by the two polarizing splitters 52 and 54 and apply the added beams to the first output port 6 and the second output port 8.

Figure 4C:
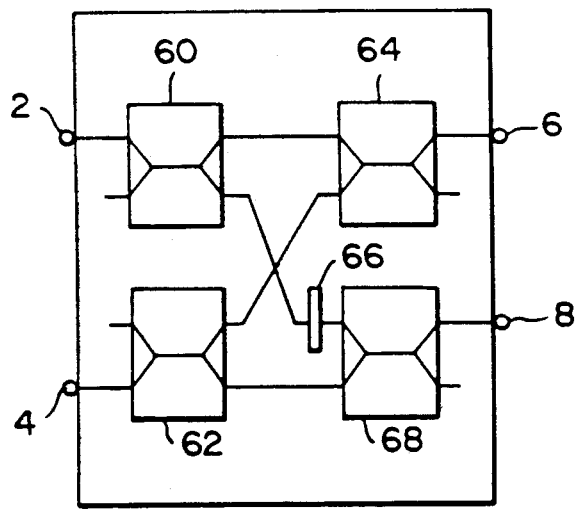

An optical hybrid circuit shown in FIG. 4C comprises two optical couplers 60 and 62 which branch the signal beam received at the first optical input port 2 and the second optical input port 4, an optical coupler 64 which adds the signal beam (or the local-oscillator beam) branched by the optical coupler 60 to the local-oscillator beam (or the signal beam) branched by the optical coupler 62 and applies the added beam to the first optical output port 6, a phase shifter 66 which shifts the phase of the signal beam (or the local-oscillator beam) branched by the optical coupler 60 by 90°, and an optical coupler 68 which adds the signal beam (or the local-oscillator beam) branched by the optical coupler 60 and phase-shifted by the phase shifter 66 to the local-oscillator beam (or the signal beam) branched by the optical coupler 62 and applies the added beam to a second optical output port 8.

For the optical hybrid circuit shown in FIG. 4A or 4B, the signal beam or the local-oscillator beam is applied to the first optical input port 2 in a linearly polarized beam and the other is applied to the second optical input port 4 in a circularly polarized beam, or the signal beam and the local-oscillator beam are applied respectively to the first optical input port 2 and the second optical input port 4 in elliptically polarized beams having a phase shift equal to the phase difference between the linear-polarized beam and the circular-polarized beam. For the optical hybrid circuit shown in FIG. 4C, the signal beam and the local-oscillator beam are applied in linearly polarized beams respectively to the first optical input port 2 and the second optical input port 4. The optical path length is adjusted and the plane of polarization is secured so that the polarized state is maintained as far as the light receiving surface.

The signal beam and the local-oscillator beam are applied to the optical hybrid circuit in such specific states of polarization to realize a phase diversity system by branching the received signal beam into two branch beams, adding the 90°-shifted local-oscillator beam to the branched signal beams and making the added beams reach the light receiving surfaces.

Each optical coupler may be of a fiber fusion type utilizing evanescent wave coupling or of a waveguide type, desirably, an optical coupler capable of conserving the plane of polarization. The optical couplers may be half mirrors.

Figure 5:
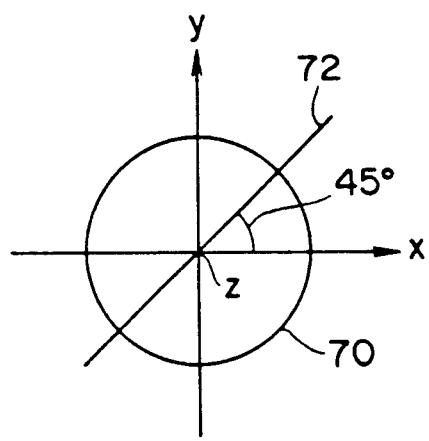
FIG. 5 is a graph showing a mode of polarization of a signal beam and a local-oscillator beam applied to the optical hybrid circuit of FIG. 4A or 4B.

FIG. 5 shows a graph of assistance in explaining a desirable state of polarization of the signal beam and the local-oscillator beam applied to the optical hybrid circuit shown in FIG. 4A or 4B included in the receiver shown in FIG. 1 or 2, in which the direction of light propagation coincides with that of the z-axis, the plane of polarization of a P-polarized beam divided by the polarizing splitter is included in the x-z plane and the plane of polarization of an S-polarized beam is included in the y-z plane of an orthogonal three-dimensional coordinate system, which applies also to FIGS. 6 and 7. The state of polarization of the signal beam and that of the local-oscillator beam may be interchanged. In the following description, it is assumed that the signal beam is a linearly polarized beam and the local-oscillator beam is a circularly polarized beam. In FIG. 5, a circle 70 is the projection of the locus of the tip of the field vector of the local-oscillator beam propagating in a circularly polarized beam on the x-y plane, and a line segment 72 is the projection of the locus of the extremity of the field vector of the signal beam propagating in a linearly polarized beam on the x-y plane. The local-oscillator beam 70 may be either a clockwise circularly polarized beam or a counterclockwise circularly polarized beam with respect to the direction of propagation. When the signal beam 72 is a 45° linearly polarized beam having a plane of polarization inclined at an angle of 45° to the positive direction of the x-axis in a counterclockwise direction, the branched signal beams divided by the polarizing splitter are equal to each other in power and hence optical powers that appear respectively at the first optical output port 6 and the second optical output port 8 are equal to each other to enhance the receiving sensitivity. Hereinafter, a linearly polarized beam having a plane of polarization inclined at an angle of $\theta°$ to the positive direction of the x-axis in a counterclockwise direction will be designated as a $\theta°$ linearly polarized beam.

When the local-oscillator beam 70 and the signal beam 72 of such characteristics are applied respectively, for example, to the first optical input port 2 and second optical input port 4 of the optical hybrid circuit shown in FIG. 4A, the optical coupler 48 adds the local-oscillator beam 70 and the signal beam 72, and the polarizing splitter 50 splits the same. The phase shift between the split signal beams is zero, but the phase shift between the split local-oscillator beams is at the polarizing splitter 50. The 90°-shifted local-oscillator beams are added to the branched signal beams and the added beams are applied to the first optical output port 6 and the second optical output port 8.

When the signal beam 72 and the local-oscillator beam 70 are applied respectively to the first optical input port 2 and second optical input port 4 of the optical hybrid circuit shown in FIG. 4B, the optical hybrid circuit adds the 90°-shifted local-oscillator beams to the branched signal beams and applies the added beams respectively to the first optical output port 6 and the second optical output port 8 after performing light beam adding and light beam branching in order reverse to that in which the optical hybrid circuit shown in FIG. 4A performs the same.

Figure 6A:
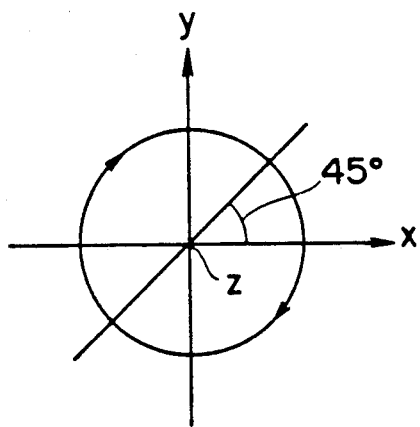
FIG. 6A and 6B are graphs showing modes of polarization of a signal beam and a local-oscillator beam applied to the optical hybrid circuit of FIG. 4A or 4B.
Figure 6B:
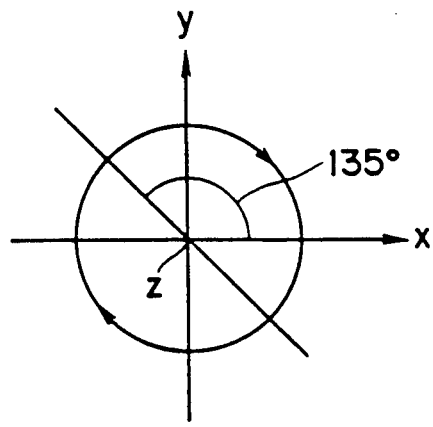

FIGS. 6A and 6B are graphs of assistance in explaining desirable states of polarization of a signal beam and a local-oscillator beam applied to the optical hybrid circuit shown in FIGS. 4A and/or 4B included in a receiver shown in FIG. 3. When a signal beam and a local-oscillator beam applied to either the first optical hybrid circuit 10A or the second optical hybrid circuit 10B are a 45° linearly polarized beam and a clockwise circularly polarized beam, as shown in FIG. 6A, respectively, a 135° linearly polarized beam and a clockwise circularly polarized beam as shown in FIG. 6B are applied as a signal beam and a local-oscillator beam, respectively, to the other optical hybrid circuit. Thus, the two optical hybrid circuits shift the phase of the local-oscillator beam in reverse directions, respectively. For example, when the phase of the local-oscillator beam added to the signal beam to be applied to the first optical port 6 of one of the two optical hybrid circuits is advanced by 90° relative to the phase of the local-oscillator beam added to the signal beam to be applied to the second optical output port 8 of the same optical hybrid circuit, the phase of the local-oscillator beam added to the signal beam to be applied to the first optical output port 6 of the other optical hybrid circuit can be delayed by 90° relative to the local-oscillator beam added with the signal beam to be applied to the second optical output port 8 of the same optical hybrid circuit.

Figure 7A:
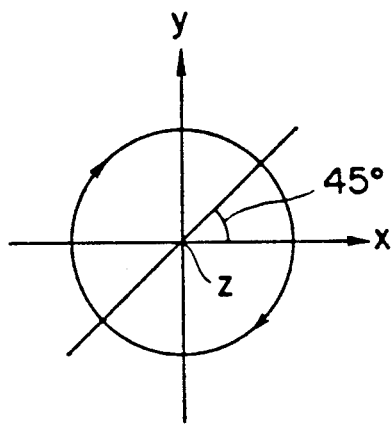
FIGS. 7A and 7B are graphs showing further modes of polarization of a signal beam and a local-oscillator beam applied to the optical hybrid circuit of FIG. 4A or 4B.
Figure 7B:
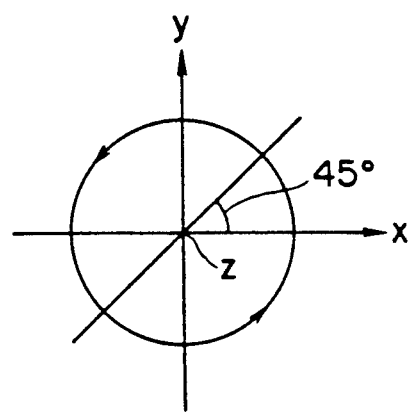

When a signal beam and a local-oscillator beam applied to one of the two optical hybrid circuits are a 45° linearly polarized beam and a clockwise circularly polarized beam as shown in FIG. 7A, respectively, the respective phase shifting directions of the two optical hybrid circuits in shifting the phases of the local oscillator beams applied respectively to the two optical hybrid circuits can be reverse to each other when a signal beam and a local-oscillator beam applied to the other optical hybrid circuit are a 45° linearly polarized beam and a counterclockwise circularly polarized beam as shown in FIG. 7B, respectively.

When the receiver in the first or second embodiment of the present invention employs the optical hybrid circuit shown in FIG. 4C, the interference efficiency can be increased to a maximum by using linearly polarized beams having planes of polarization coinciding with each other as the input signal beam and the input local-oscillator beam and by maintaining the coincidence of the planes of polarization as far as the light receiving surfaces to increase the receiving sensitivity to a maximum.

When the receiver in the third embodiment of the invention employs the optical hybrid shown in FIG. 4C, the phase shift produced by one of the phase shifters 66 is −90° when the phase shift produced by the other is 31 90° (+270°).

Although the description made with reference to FIGS. 5 to 7B is based on an assumption that the signal beam and the local-oscillator beam applied to the optical hybrid circuit shown in FIG. 4A or 4B are a linearly polarized beam and a circularly polarized beam, respectively, the signal beam and the local-oscillator beam applied respectively to the first optical input port 2 and the second optical input port 4 may be elliptically polarized beams, which will be described hereinafter with reference to FIG. 8.

Figure 8:
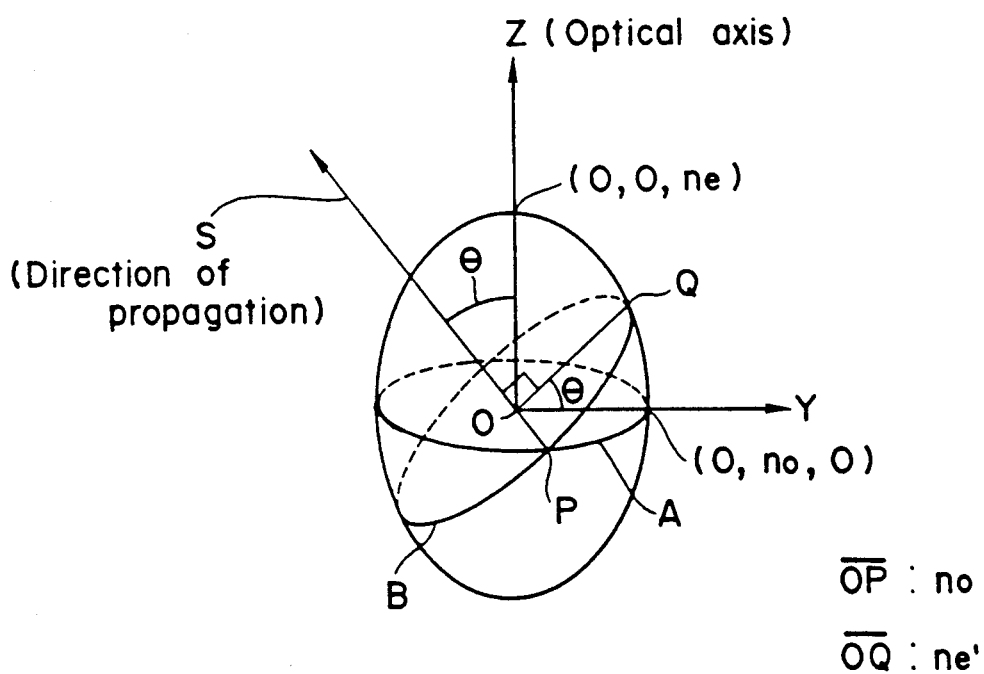
FIG. 8 is a graph of assistance in explaining the circular polarization and elliptic polarization of linearly polarized light, showing an index ellipsoid.

FIG. 8 shows an index ellipsoid of assistance in explaining circular polarization and elliptic polarization. Generally, when a local-oscillator beam is emitted by a local light source, such as a laser diode, in a linearly polarized beam like the signal beam 72 shown in FIG. 5, the linearly polarized local-oscillator beam can be converted into a circularly polarized beam by using a quarter wavelength plate which functions at different refractive indices respectively with a polarized component having a plane of polarization included in the x-z plane and a polarized component having a plane of polarization included in the y-z plane. The quarter wavelength plate is a birefringent plate having a given thickness and disposed in a given crystal orientation. Suppose that the refractive index of the birefringent plate with an ordinary beam is $n_o$, a maximum refractive index of the same with an extraordinary beam is $n_e$ ($n_o < n_e$), a light beam is traveling in the direction of an arrow S from the origin O of an orthogonal three-dimensional coordinate system having the Z-axis coinciding with the optical axis of the birefringent plate, and the projection of the arrow S on the X-Y plane is included in the Y-axis. Then, the index ellipsoid is expressed by $$(X^2/n_o^2) + (Y^2/n_o^2) + (Z^2/n_e^2) = 1 \qquad (1)$$

The refractive index $n_o$ with the ordinary beam is a constant corresponding to the distance OP between the origin O and a point P where a circle A obtained by intersecting the index ellipsoid with the X-Y plane intersects an ellipse B obtained by intersecting the index ellipsoid with a plane including the origin O and perpendicular to the direction S of propagation. The refractive index $n_e'$ with the extraordinary beam varies according to the angle $\theta$ between the direction S of propagation and the Z-axis and corresponds to the distance OQ between the origin O and a point Q where the ellipse B intersects the Y-Z plane. The refractive index $n_e'$ with the extraordinary beam varies continuously between $n_o$ and $n_e$ according to the direction S of propagation. Since the difference between the refractive index of the birefringent plate with the ordinary beam and that of the same with the extraordinary beam varies according to the direction S of propagation of the extraordinary beam, the input local-oscillator beam, i.e., the linearly polarized beam, can be converted into a circularly polarized beam by disposing orienting the optical axis of the birefringent plate so that the direction S of propagation of the local-oscillator beam coincides with the Y-axis ($\theta = 90°$) so that the plane of polarization of the local-oscillator beam inclined at an angle of 45° to the lines OP and OQ, and by selectively determining the thickness of the birefringent plate so that the phase difference between the orthogonal polarized components of the local-oscillator beam is 90°.

Accordingly, it is possible to use an elliptically polarized beam having an appropriate ellipticity as either the signal beam or the local-oscillator beam, and an elliptically polarized beam having a corresponding ellipticity as the other beam, and to make the phase relation between the elliptically polarized beams correspond to the phase relation between a linearly polarized beam and a circularly polarized beam by utilizing the characteristics of the birefringent plate.

Two dual-detector balanced optical receivers (DBORs) of different circuit configurations will be described hereinafter with reference to FIGS. 9A and 9B.

Figure 9A:
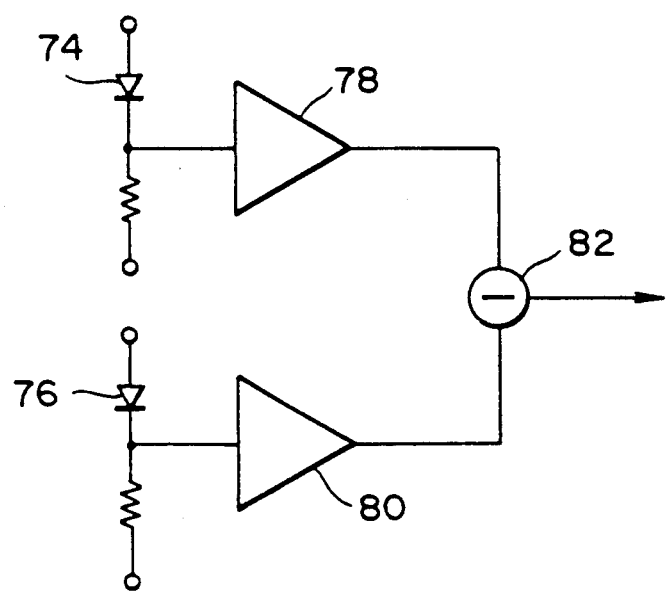
FIGS. 9A and 9B are circuit diagrams of double-balanced photodetectors.
Figure 9B:
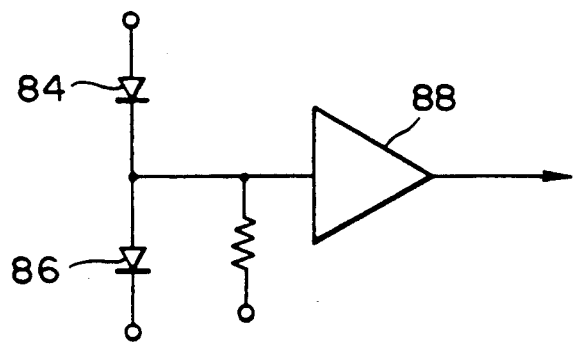

The DBOR shown in FIG. 9A amplifies voltage changes corresponding to photocurrent changes in two light receiving elements 74 and 76, such as pin photodiodes, having the same characteristics respectively by amplifiers 78 and 80, and applies the amplified voltage changes to subtracter 82 for subtraction. When the respective optical path lengths of light beams incident on the light receiving elements 74 and 76 are adjusted, the respective phases of signal components falling on the light receiving elements 74 and 76 are opposite to each other and the respective phases of intensity noise components are the same due to the inversion of optical phase by the optical coupler. Accordingly, the signal components are added and the intensity noise components cancel each other to suppress the intensity noise of the local oscillator or the like. It is also possible to connect light receiving elements 84 and 86 having the same characteristics in series as shown in FIG. 9B, and the potential variation at the connecting point may be amplified by an amplifier 88.

When the DBOR is employed, the output signal beams and the output local oscillator beams of the optical hybrid circuit must be applied through two paths to the two light receiving elements, and hence the configurations of the optical hybrid circuits shown in FIGS. 4A, 4B and 4C must be modified. FIGS. 10A, 10B and 10C are modifications of the optical hybrid circuits shown in FIGS. 4A, 4B and 4C, respectively.

An optical hybrid circuit shown in FIG. 10A is provided, in addition to the polarizing splitter 50 for splitting one of the beams branched by the optical coupler 48, a polarizing splitter 90 for splitting the other beam.

P waves split by the polarizing splitters 50 and 90 are applied respectively to the optical output ports 6a and 6b of the first optical output 6. S waves split by the polarizing splitters 50 and 90 are applied to the optical output ports 8a and 8b of the second optical output port 8. The two P waves and the two S waves are applied through optical paths having appropriate optical path lengths respectively to the two light receiving elements 74 and 76, or 84 and 86 of the DBOR.

An optical hybrid circuit shown in FIG. 10B branches each of added beams added by the optical couplers 56 and 58 into two branch beams. The optical outputs of the optical coupler 56 is applied to the optical output ports 6a and 6b of the first optical output port 6, and the optical outputs of the optical coupler 58 are applied to the optical output ports 8a and 8b of the second optical output port 8.

An optical hybrid circuit shown in FIG. 10C, similarly to that shown in FIG. 10B, applies the respective two optical outputs of two optical couplers 64 and 68 respectively to the first optical output port 6 and the second optical output port 86.

The concrete circuit configuration and functions of the electrical 90° hybrid circuit 24 employed in the receiver embodying the present invention will be described hereinafter.

The electrical 90° hybrid circuit 24 transmits a signal from the first electrical input port 16 to the first electrical output port 20 and from the second electrical input port 18 to the second electrical output port 22 at 3 dB loss without changing the phase of the signal, and transmits a signal from the first electrical input port 16 to the second electrical output port 22 and from the second electrical input port 18 to the first electrical output port at 3 dB loss changing the phase of the signal by 90°. The circuit configuration is changed according to the frequency band of the signal.

Delays given to signals by the equalizers 26 and 28 are dependent on the frequencies of the signals. The equalizers 26 and 26 may comprise, for example, a microstrip line or a slot line having a linear characteristic in a wide band.

When the demodulator 30 and 32 are of a DPSK (differential phase shift keying) system, the circuit configurations of the demodulators 30 and 32 are determined on the basis of the principle of demodulation of 1-bit delay.

The characteristic operation of the receivers in the first to third embodiments according to the present invention will be described hereinafter.

Assuming that the receiver in the first embodiment operates in a PSK mode, $$E_S = C_1 \cos(\omega_s t + \phi) \quad (2)$$

wherein $E_S$ is the field intensity of the input signal beam, $C_1$ is an optional constant, $\omega_S$ is the angular frequency of the carrier, $\phi$ is the phase difference between the electric field of the signal beam and that of the local-oscillator beam, which remains constant in one time slot (the reciprocal of bit rate). The signal beam is divided by the optical hybrid circuit 10 into two branch signal beams, the two branch signal beams are added to the local-oscillator beams of angular frequency $\omega_L$ having 90° phase difference, and the added beams are subjected to the square-law detection of the photodetectors 12 and 14. The photodetectors 12 and 14 produce photocurrents $I_1$ and $I_2$ expressed by $$I_1 = C_2 \cos(\omega_{OFF} t - \phi) \quad (3)$$

$$I_2 = -C_2 \operatorname{sgn}(\omega_S - \omega_L) \sin(\omega_{OFF} t - \phi) \quad (4)$$

where $C_2$ is an optional constant, $\omega_{OFF}$ is offset angular frequency for the AFC (automatic frequency control) of the local-oscillator beam expressed by $$\omega_{OFF} = \omega_S - \omega_L \quad (5)$$

The $\operatorname{sgn}(\omega_S - \omega_L)$ is defined by $$\begin{aligned}\operatorname{sgn}(\omega_S - \omega_L) &= 1 \ (\omega_S - \omega_L > 0) \\ &= -1 \ (\omega_S - \omega_L < 0)\end{aligned} \quad (6)$$

To facilitate qualitative understanding, expressions (3) and (4) are changed as follows taking into consideration only the relative relation between these phases.

$$I_1 = \cos\omega t \quad (7)$$

$$I_2 = \operatorname{sgn}(\omega_S - \omega_L)\sin\omega t \quad (8)$$

Similarly, input signals $I_3$ and $I_4$ to the additional electrical 90° hybrid circuit 24B included in the receiver in the second or third embodiment are $$I_3 = \cos\omega t \quad (9)$$

$$I_4 = \operatorname{sgn}(\omega_S - \omega_L)\sin\omega t \quad (10)$$

Representing an operation for delaying the phase by 90° by "*", $$(\cos\omega t)^* = \sin\omega t \quad (11)$$

$$(\sin\omega t)^* = -\cos\omega t \quad (12)$$

Output signals $O_1$, $O_2$, $O_3$ and $O_4$ corresponding to the inputs to the electrical 90° hybrid circuit 24 are $$O_1 = 1/\sqrt{2}\cdot(I_1 + I_2^*) = 1/\sqrt{2}\cdot(1 - \operatorname{sgn}(\omega_S - \omega_L))\cos\omega t \quad (13)$$

$$O_2 = 1/\sqrt{2}\cdot(I_1^* + I_2) = 1/\sqrt{2}\cdot(1 = \operatorname{sgn}(\omega_S - \omega_L))\sin\omega t \quad (14)$$

$$O_3 = 1/\sqrt{2}\cdot(I_3 + I_4^*) = 1/\sqrt{2}\cdot(1 - \operatorname{sgn}(\omega_S - \omega_L))\cos\omega t \quad (15)$$

$$O_4 = 1/\sqrt{2}\cdot(I_3^* + I_4) = 1/\sqrt{2}\cdot(1 - \operatorname{sgn}(\omega_S - \omega_L))\sin\omega t \quad (16)$$

The following table shows the contents of expressions (13) to (16).

Figure 11A:
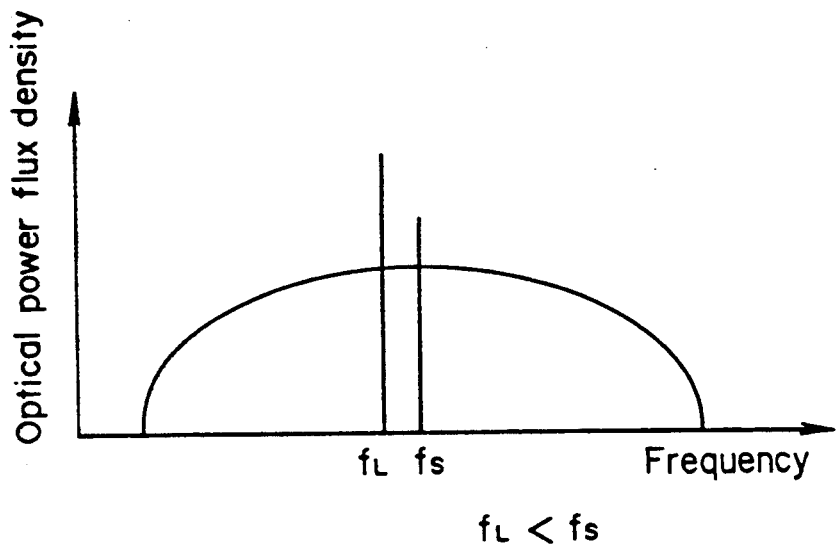
FIGS. 11A and 11B are graphs of assistance in explaining the relative relation between a signal beam and a local-oscillator beam on the frequency axis.
Figure 12A:
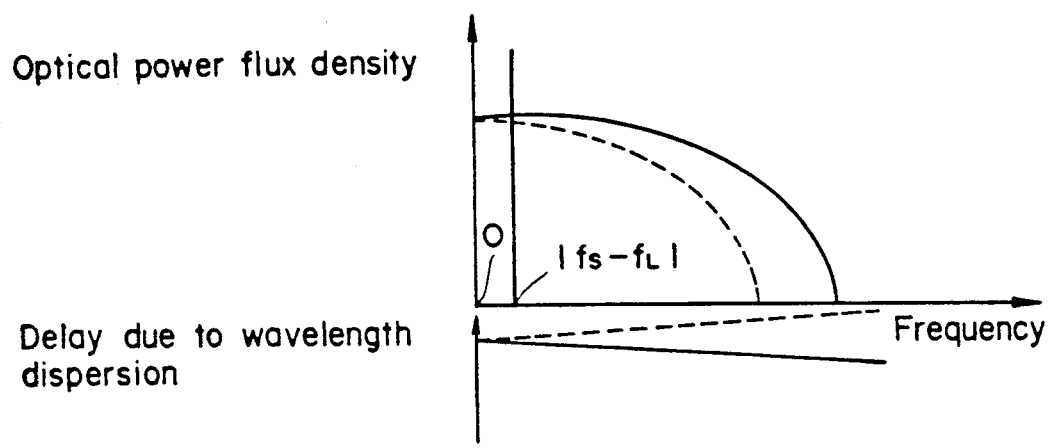
FIGS. 12A and 12B are graphs of assistance in explaining a state where the upper and lower sidebands are folded, and delay attributable to wavelength dispersion.
Figure 12B:
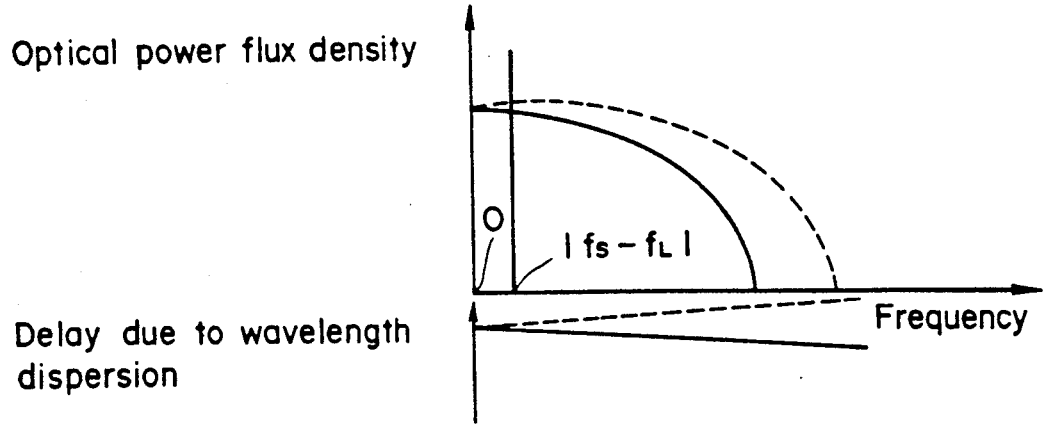
Figure 13A:
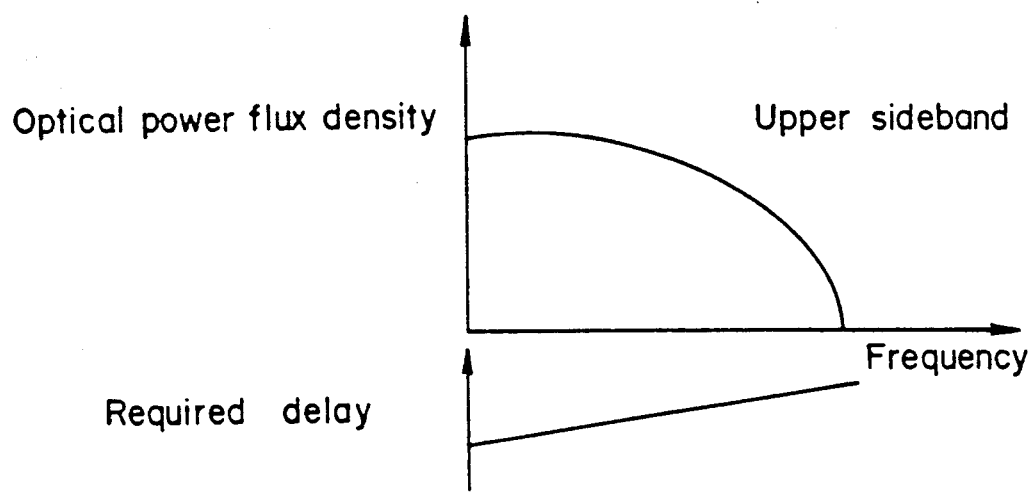
FIGS. 13A and 13B are graphs of assistance in explaining the delaying characteristics of an equalizer necessary for the compensation of delay in a signal in the upper sideband and a signal in the lower sideband attributable to the wavelength dispersion.
Figure 13B:
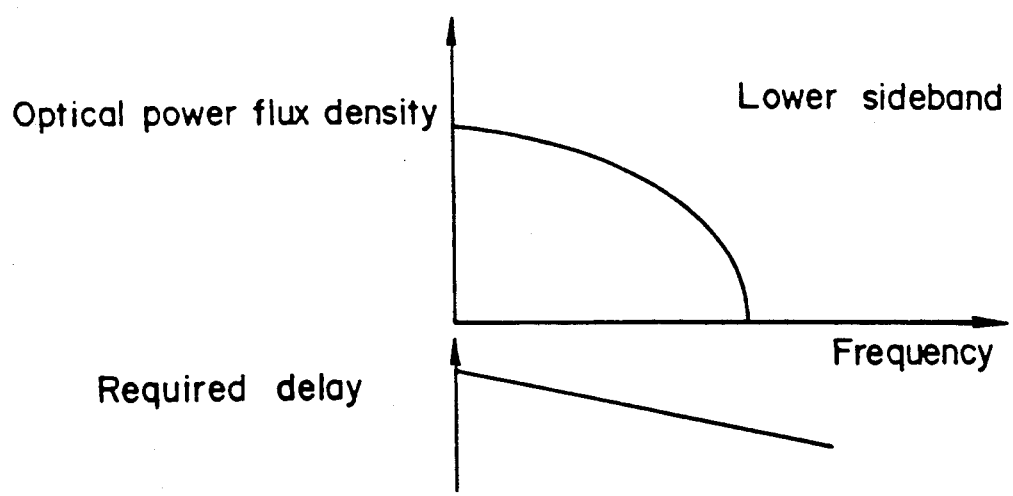

As shown in the table, the electrical 90° hybrid circuit provides output signals in the upper sideband and those in the lower sideband separately, and hence signal degradation attributable to wavelength dispersion can be prevented by delaying the output signals according to their frequencies by the equalizers, which will be described below with reference to FIGS. 11 to 13.

TABLE

| Output signal | $O_1$ | $O_2$ | $O_3$ | $O_4$ |
|---|---|---|---|---|
| $0 < \omega_S - \omega_L$ (upper sideband) | $\sqrt{2}\cdot\cos\omega t$ | 0 | 0 | $\sqrt{2}\cdot\sin\omega t$ |
| $0 > \omega_S - \omega_L$ (lower sideband) | 0 | $\sqrt{2}\cdot\sin\omega t$ | $\sqrt{2}\cdot\cos\omega t$ | 0 |

Figure 11B:
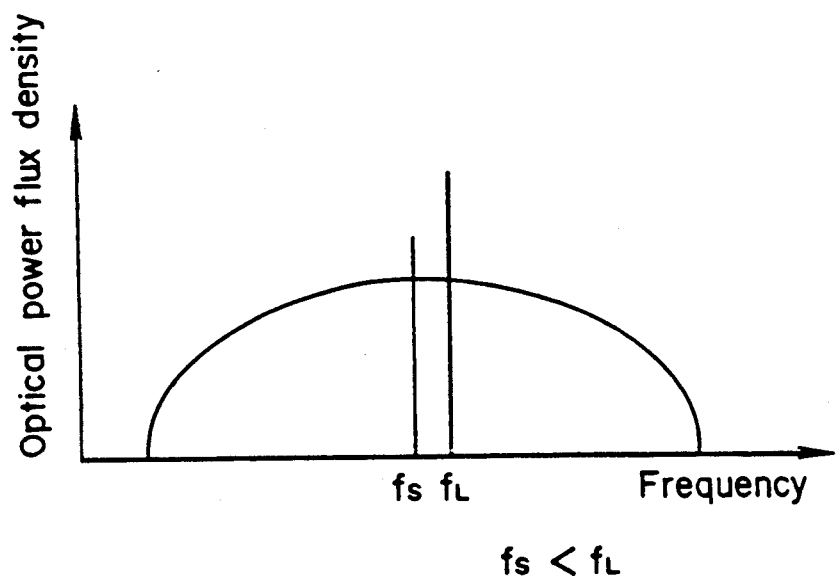

In the phase diversity system, the relation between the frequency $f_S$ of the signal beam and the frequency $f_L$ of the local-oscillator beam is $f_L < f_S$ (FIG. 11A) or $f_S < f_L$ (FIG. 11B). In either case, the upper sideband (continuous line) and lower sideband (broken line) of the output signals of the photodetectors 12 and 14 are folded as shown in FIGS. 12A and 12B. FIGS. 12A and 12B correspond respectively to FIGS. 11A and 11B. Generally, when the optical transmission line is a quartz optical fiber of zero dispersion in the 1.3 μm band, the wavelength dispersion causes smaller delays for higher frequencies in upper sideband signals, and causes greater delays for higher frequencies in lower sideband signals. Accordingly, the equalizer is unable to compensate the output signal of the photodetector directly, which is a previously describe problem in the general phase diversity system.

In the receivers in the first to third embodiments of the present invention, the electrical 90° hybrid circuit 24 is able to provide the upper sideband signal and the lower sideband signal separately. Therefore, the wavelength dispersion can be compensated by using an equalizer which gives greater delays for higher frequencies for the upper sideband signal, and an equalizer which gives smaller delays for higher signal frequencies for the lower sideband signal.

In the receiver in the first embodiment of the present invention, the output signals $O_1$ and $O_2$ of the electrical 90° hybrid circuit 24 are an upper sideband signal and a lower sideband signal as shown in the table. Therefore, the respective characteristics of the equalizers 26 and 28 are reverse to each other. On the other hand, in the receivers in the second and third embodiments of the present invention, only the upper sideband signals $O_1$ and $O_4$ among the output signals of the first electrical 90° hybrid circuit 24A and the second electrical 90° hybrid circuit 24B are used, and hence the equalizers 26 and 28 are the same in characteristics. When the outputs $O_2$ and $O_3$ are used, equalizers having the same characteristics which are reverse to those of the equalizers employed when the outputs $O_1$ and $O_4$ are used may be employed.

In the receivers in the first to third embodiments of the present invention, the upper sideband signal and the lower sideband signal are separated from each other on a principle similar to an image rejection principle. Therefore, dispersion in each signal must be compensated by an equalizer to realize phase diversity. Accordingly, at least two equalizers are necessary. A receiver in a fourth embodiment of the present invention functions properly on a single equalizer.

Figure 14:
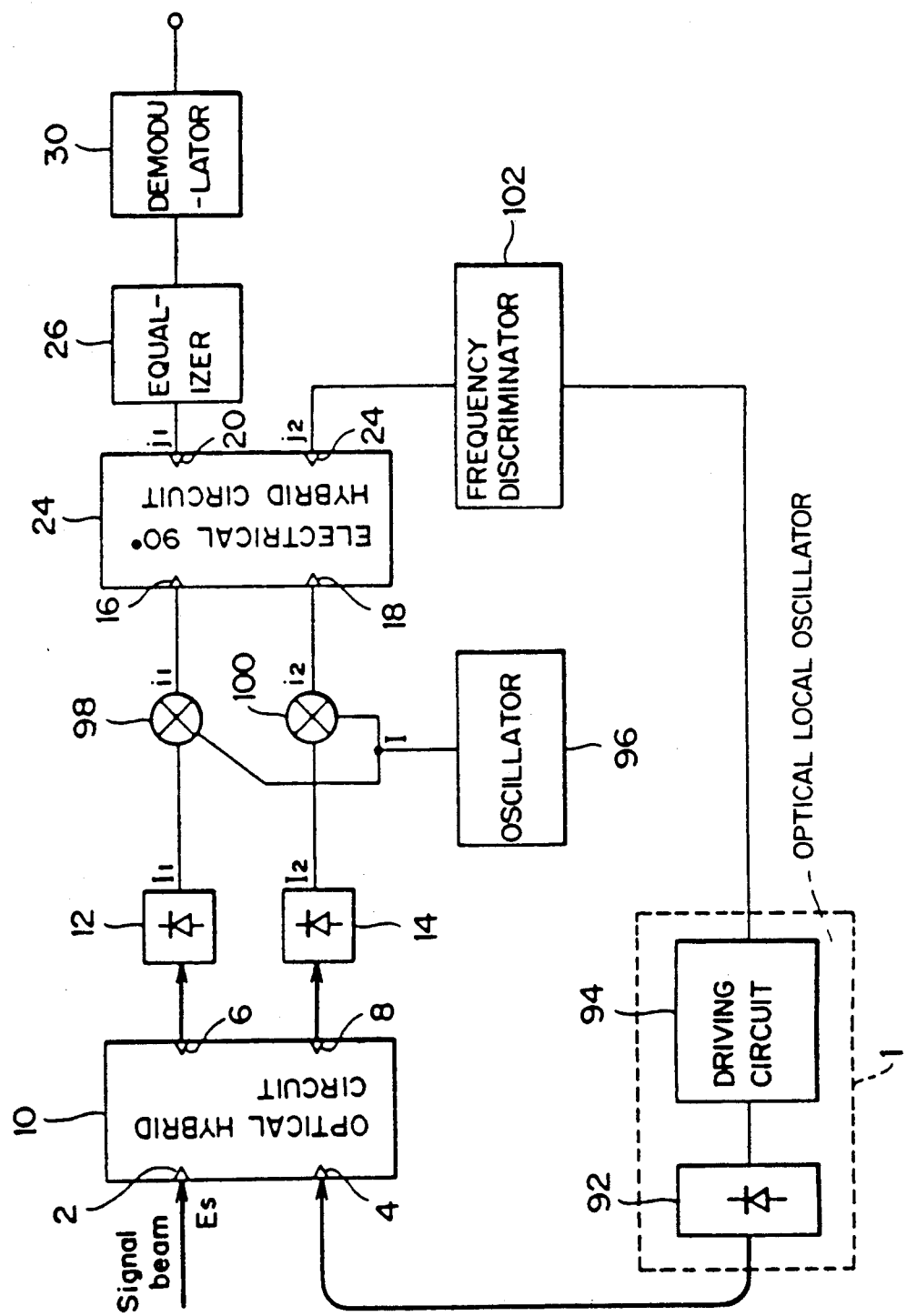
FIG. 14 is a block diagram of a receiver in a fourth embodiment according to the present invention.

FIG. 14 is a block diagram of the receiver in the fourth embodiment according to the present invention. An optical local oscillator 1 comprises a light source (laser diode) 92 and a driving circuit 94 which drives the light source 92 by controlling the oscillation frequency through the control of the bias current supplied to the light source 92. The optical local oscillator 1 comprises further an optical hybrid circuit 10 and an electrical 90° hybrid circuit 24, which are similar to those of the first to third embodiments, respectively. The output signal of a photodetector 12 is added with the output signal of an oscillator by a mixer 98 for up-conversion and the added signal is applied to an electrical 90° hybrid circuit 24. The output signal of a photodetector 14 is added with the output signal of the oscillator 96 by a mixer 100 for up-conversion and the added signal is applied to the electrical 90° hybrid circuit 24. An optical signal of the electrical 90° hybrid circuit 24 at a first electrical output port 20 is applied through an equalizer 26 to a demodulator 30. An output signal of the electrical 90° hybrid circuit 24 at a second electrical output port 24 is applied to a frequency discriminator 102. The oscillation frequency of the local oscillator 1 is controlled in a feedback control mode so that the frequency of the input signal to the frequency discriminator 102 is constant.

The output photocurrents $I_1$ and $I_2$ of the photodetectors 12 and 14 are expressed by expressions (3) and (4).

The two electrical signals obtained by optical detection are added by mixers 98 and 100 with the output current I of the oscillator 96 having an angular frequency $\omega_{IF}(>>\omega_{OFF})$.

$$I = C_3 \cos\omega_{IF} t \qquad (17)$$

where $C_3$ is an optional constant. The output currents $i_1$ and $i_2$ of the mixers 98 and 100 are expressed by the following expressions, in which $\text{sgn}(\omega_S - \omega_L)$ is neglected for simplicity.

$$\begin{aligned} i_1 &= C_4 \cos(\omega_{OFF} t - \phi)\cos \omega_{IF} t = C_4 \cos A \cdot \cos B \\ &= (C_4/2)\{\cos(A - B) - \cos(B - A)\} \end{aligned} \qquad (18)$$

$$\begin{aligned} i_2 &= -C_4 \sin(\omega_{OFF} t - \phi)\cos \omega_{IF} t \\ &= -C_4 \sin A \cdot \cos B \\ &= (-C_4/2)\{\sin(A - B) - \sin(B - A)\} \end{aligned} \qquad (19)$$

where $C_4$ is an optional constant and $$A = \omega_{OFF} t - \phi \qquad (20)$$

$$B = \omega_{IF} t \qquad (21)$$

Conversion for delaying phase by 90° is represented by "*" and $$\cos(A - B) = \alpha \qquad (22)$$

$$\cos(B - A) = \beta \qquad (23)$$

Then, $$\alpha^* = \sin(A - B)$$

$$\beta^* = \cos(B - A)$$

Therefore expressions (18) and (19) can be rewritten as $$i_1 = (C_4/2)(\alpha + \beta) \qquad (24)$$

$$i_2 = (-C_4/2)(\alpha^* - \beta^*) \qquad (25)$$

Accordingly, when the frequency-up-converted currents $i_1$ and $i_2$ are supplied to the electrical 90° hybrid circuit 24, the outputs of the electrical 90° hybrid circuit 24 are $$\begin{aligned} j_1 &= i_1/2 + i_2^*/2 = (C_4/4)(\alpha + \beta) - (C_4/4)(\alpha^* - \beta^*)^* \\ &= (C_4/2)\alpha = (C_4/2)\cos\{(\omega_{IF} + \omega_{OFF})t + \phi\} \end{aligned} \qquad (26)$$

$$\begin{aligned} j_2 &= i_1^*/2 + i_2/2 = (C_4/4)(\alpha + \beta)^* - (C_4/4)(\alpha^* - \beta^*) \\ &= (C_4/2)\beta^* = (C_4/2)\sin\{(\omega_{IF} - \omega_{OFF})t + \phi\} \end{aligned} \qquad (27)$$

It is obvious from expression (26) that a photocurrent equal to that obtained through heterodyne detection using the IF ($\omega_{OFF} - \omega_{IF}$) is obtained. Accordingly, similarly to the procedure in the ordinary heterodyne system, the demodulator 30 is able to provide a baseband signal after applying the output current $j_1$ to the equalizer 26 to compensate dispersion in the optical fiber. Thus, the receiver in the fourth embodiment is effective for the enhancement of transmission speed and realizes a phase diversity system not requiring a light source with a very narrow spectral line width. Furthermore, the receiver is capable of compensating dispersion in the optical fiber. The output currents $j_1$ and $j_2$ may be used respectively for the AFC of the optical local oscillator 1 and the baseband signal demodulation.

The present invention is not limited to the foregoing specific embodiments in its practical application. For example, the optical hybrid circuit comprising, in combination, the components respectively for particular functions, such as optical couplers, may be substituted by a single device comprising a waveguide substrate carrying elements corresponding to all those components of the optical hybrid circuit to provide a compact receiver. Such a device provided with the light receiving elements of photodetectors directly formed on the waveguide substrate secures an accurate optical distance between the light receiving element and the optical coupler or the polarizing splitter to improve the reliability of the receiver.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A receiver for coherent optical communication comprising: an optical local oscillator which emits a local-oscillator beam;
    an optical hybrid circuit, operatively connected to said optical local oscillator, which is provided with a first optical input port for receiving a signal beam, a second optical input port for receiving the local-oscillator beam, a first optical output port and a second optical output port, said optical hybrid circuit branching the signal beam to produce a first branched signal beam and a second branched signal beam and branching the local-oscillator beam to produce a first branched local oscillator beam and a second branched local-oscillator beam, said optical hybrid circuit producing a predetermined phase shift between the first branched signal beam and the second branched signal beam or between the first branched local-oscillator beam and the second branched local-oscillator beam, and said optical hybrid circuit adding the first branched signal beam and the first branched local-oscillator beam to produce a first added beam and adding the second branched signal beam and the second branched local-oscillator beam to produce a second added beam, and applying the first and second added beams respectively to the first and second optical output ports;
    a first photodetector operatively connected to said optical hybrid circuit, for the photoelectric conversion of a beam received from the first optical output port of the optical hybrid circuit;
    a second photodetector, operatively connected to said optical hybrid circuit, for the photoelectric conversion of a beam received from the second optical output port of the optical hybrid circuit;
    an electrical 90° hybrid circuit, operatively connected to said first and second photodetectors, which is provided with first and second electrical input ports for receiving the output signals of the first and second photodetectors, respectively, and first and second electrical output ports, said electrical 90° hybrid circuit adding the signal received at the first electrical input port to the signal received at the second electrical input port after shifting the phase of the signal received at the first electrical input port by 90° to obtain an added signal and applying the added signal to the second electrical output port, and said electrical 90° hybrid circuit adding the signal received at the second electrical input port to the signal received at the first electrical input port after shifting the phase of the signal received at the second electrical input port by 90° to obtain an added signal and applying the added signal to the first electrical output port;
    a first equalizer, operatively connected to said electrical 90° hybrid circuit, which delays a signal received from the first electrical output port by a delay corresponding to the frequency of the same received signal;
    a second equalizer, operatively connected to said electrical 90° hybrid circuit, which delays a signal received from the second electrical output port by a delay corresponding to the frequency of the same received signal;
    a first demodulator, operatively connected to said first equalizer, which demodulates an output signal of the first equalizer;
    a second demodulator, operatively connected to said second equalizer, which demodulates an output signal of the second equalizer; and
    an adder, operatively connected to said first and second demodulators, which adds the respective output signals of the first and second demodulators.

2. A receiver for coherent optical communication according to claim 1, wherein a first sign of a proportionality constant of either the first equalizer or the second equalizer, for determining a delay according to the frequency, is positive, and a second sign of the proportionality constant of the other of the first equalizer or the second equalizer, is negative.

3. A receiver for coherent optical communication according to claim 2, wherein the optical hybrid circuit comprises: an optical coupler which adds the signal beam applied to the first optical input port to the local-oscillator beam applied to the second optical input port and branches the added beam to provide branched beams; and a polarizing splitter which splits at least one of the branched beams branched by the optical coupler so that the polarized components of the signal beam and the local-oscillator beam are applied to the first and second optical output ports.

4. A receiver for coherent optical communication according to claim 3, wherein either the input signal beam or the input local oscillator beam to the optical hybrid circuit is a linearly polarized beam and the other is a circularly polarized beam.

5. A receiver for coherent optical communication according to claim 3, wherein the input signal beam and the input local-oscillator beam are elliptically polarized beams having the same phase shift corresponding to the phase difference between the linearly polarized beam and the circularly polarized beam.

6. A receiver for coherent optical communication according to claim 3, wherein the optical hybrid circuit comprises: first and second polarizing splitters for splitting the signal beam applied to the first optical input port and the local-oscillator beam applied to the second optical input port so that the polarized components of the signal beam and the local-oscillator beam are provided; and first and second optical couplers which add the output beams having the same plane of polarization provided by the first and second polarizing splitters and apply the added beams to the first and second optical output ports.

7. A receiver for coherent optical communication according to claim 6, wherein either the signal beam or the local-oscillator beam applied to the optical hybrid circuit is a linearly polarized beam and the other is a circularly polarized beam.

8. A receiver for coherent optical communication according to claim 6, wherein the signal beam and the local-oscillator beam applied to the optical hybrid circuit are elliptically polarized beams having the same phase shift corresponding to the phase difference between the linearly polarized beam and the circularly polarized beam.

9. A receiver for coherent optical communication comprising:
- an optical local oscillator which emits a local-oscillator beam;
- an optical hybrid circuit, operatively connected to said optical local oscillator, which is provided with a first optical input port for receiving a signal beam, a second optical input port for receiving the local-oscillator beam, a first optical output port and a second optical output port, said optical hybrid circuit branching the signal beam to produce a first branched signal beam and a second branched signal beam and branching the local-oscillator beam to produce a first branched local oscillator beam and a second branched local-oscillator beam, said optical hybrid circuit producing a predetermined phase shift between the first branched signal beam and the second branched signal beam or between the first branched local-oscillator beam and the second branched local-oscillator beam, and said optical hybrid circuit adding the first branched signal beam and the first branched local-oscillator beam to produce a first added beam and adding the second branched signal beam and the second branched local-oscillator beam to produce a second added beam, and applying the first and second added beams respectively to the first and second optical output ports;
- a first photodetector, operatively connected to said optical hybrid circuit, for the photoelectric conversion of a beam received from the first optical output port;
- a second photodetector, operatively connected to said optical hybrid circuit, for the photoelectric conversion of a beam received from the second optical output port;
- a first branching circuit, operatively connected to said first photodetector, for branching the output signal of the first photodetector;
- a second branching circuit, operatively connected to said second photodetector, for branching the output signal of the second photodetector;
- a first electrical 90° hybrid circuit, operatively connected to said first and second branching circuits, which is provided with a first electrical input port which receives a first branched signal of the output branched signals of the first branching circuit, a second electrical input port which receives a second branched signal of the output branched signals of the second branching circuit, and a first electrical output port and a second electrical output port, said first electrical 90° hybrid circuit adding the signal applied to the first electrical input port to the signal applied to the second electrical input port after shifting the phase of the signal applied to the first electrical input port by 90° to provide an added signal and applying the same added signal to the second electrical output port, and said first electrical 90° hybrid circuit adding the signal applied to the second electrical input port to the signal applied to the first electrical input port after shifting the phase of the signal applied to the second electrical input port by 90° to provide an added signal and applying the same added signal to the first electrical output port;
- an inverter for inverting the polarity of the other output branched signal of either the first branching circuits or the second branching circuit;
- a second electrical 90° hybrid circuit, operatively connected to said first and second branching circuits, which is provided with a first electrical input port for receiving a third output branched signals not applied to the inverter for polarity inversion, a second electrical input port for receiving a fourth output branched signal inverted by the inverter, and a first electrical output port and a second electrical output port, said second electrical 90° hybrid circuit adding the signal applied to the first electrical input port to the signal applied to the second electrical input port after shifting the phase of the signal applied to the first electrical input port by 90° to obtain an added signal and applying the same added signal to the second electrical output port, and said second electrical 90° hybrid circuit adding the signal applied to the second electrical input port to the signal applied to the first electrical input port after shifting the phase of the signal applied to the second electrical input port by 90° to obtain an added signal and applying the same added signal to the first electrical output port;
- first and second equalizers, operatively connected to said first and second electrical 90° hybrid circuits, which delay a signal received from the first electrical output port of the first electrical 90° hybrid circuit and a signal received from the second electrical output port of the second electrical 90° hybrid circuit by delays corresponding to their frequencies, respectively, or delay a signal received from the second electrical output port of the first electrical 90° hybrid circuit and a signal received from the first electrical output port of the second electrical 90° hybrid circuit by delays corresponding to their frequencies;
- a first demodulator, operatively connected to said first equalizer, for demodulating the output signal of the first equalizer;

a second demodulator, operatively connected to said second equalizer, for demodulating the output signal of the second equalizer; and an adder, operatively connected to said first and second demodulators for adding the output signals of the first and second demodulators.

10. A receiver for coherent optical communication according to claim 9, wherein respective signs of a proportionality constants of the first and second equalizers, for determining the delay according to the frequency are the same.

11. A receiver for coherent optical communication according to claim 10, wherein the optical hybrid circuit comprises: an optical coupler which adds the signal beam applied to the first optical input port to the local-oscillator beam applied to the second optical input port and branches the added beam to provide branched beams; and a polarizing splitter which splits at least one of the branched beams branched by the optical coupler so that the polarized components of the signal beam and the local-oscillator beam are applied to the first and second optical output ports.

12. A receiver for coherent optical communication according to claim 11, wherein either the signal beam or the local-oscillator beam applied to the optical hybrid circuit is a linearly polarized beam and the other is a circularly polarized beam.

13. A receiver for coherent optical communication according to claim 11, wherein the signal beam and the local-oscillator beam applied to the optical hybrid circuit are elliptically polarized beams having the same phase shift corresponding to the phase difference between the linearly polarized beam and the circularly polarized beam.

14. A receiver for coherent optical communication according to claim 10, wherein the optical hybrid circuit comprises: first and second polarizing splitters which split the signal beam and the local-oscillator beam applied respectively to the first and second optical input ports so that the polarized components of the signal beam and the local-oscillator beam are provided; and first and second optical couplers which add the output beams having the same plane of polarization provided by the first and second polarizing splitters and apply the added beams to the first and second optical ports.

15. A receiver for coherent optical communication according to claim 14, wherein either the signal beam or the local-oscillator beam applied to the optical hybrid circuit is a linearly polarized beam and the other is a circularly polarized beam.

16. A receiver for coherent optical communication according to claim 14, wherein the signal beam and the local-oscillator beam applied to the optical hybrid circuit are elliptically polarized beams having the same phase shift corresponding to the phase difference between the linearly polarized beam and the circularly polarized beam.

17. A receiver for coherent optical communication comprising:

a first optical branching circuit for branching a received signal beam into a first and a second signal beam;

an optical local oscillator, operatively connected to said first optical branching circuit, which emits a local-oscillator beam;

a second optical branching circuit for branching the local-oscillator beam into a first and a second local-oscillator beam;

a first optical hybrid circuit, operatively connected to said first and second optical branching circuits, which is provided with a first optical input port which receives the first signal beam, a second optical input port which receives the first local-oscillator beam, a first optical output port and a second optical output port, said first optical hybrid circuit branching the first signal beam to produce a first branched signal beam and a second branched signal beam, and branching the first local-oscillator beam to produce a first branched local-oscillator beam and a second branched local-oscillator beam, said first optical hybrid circuit producing a predetermined phase shift between the first branched signal beam and the second branched signal beam or between the first branched local-oscillator beam and the second branched local-oscillator beam and said first optical hybrid circuit adding the first branched signal beam and the first local-oscillator beam to produce a first added beam and adding the second branched signal beam and the second branched local-oscillator beam to produce a second added beam, and applying the first and second added beams respectively to the first and second optical output ports;

a second optical hybrid circuit, operatively connected to said first and second optical branching circuits, which is provided with a first optical input port which receives the second signal beam, a second optical input port which receives the second local-oscillator beam, a first optical output port and a second optical output port, said second optical hybrid circuit branching the second signal beam to produce a third branched signal beam and a fourth branched signal beam, and branching the second local-oscillator beam to produce a third branched local-oscillator beam and a fourth branched local-oscillator beam, said second optical hybrid circuit producing a predetermined phase shift between the third branched signal beam and the fourth branched signal beam or between the third branched local-oscillator beam and the fourth branched local-oscillator beam and said second optical hybrid circuit adding the third branched signal beam and the third local-oscillator beam to produce a third added beam and adding the fourth branched signal beam and the fourth branched local-oscillator beam to produce a fourth added beam, and applying the third and fourth added beams respectively to the first and second optical output ports;

first to fourth photodetectors, operatively connected to said first and second optical hybrid circuits, respectively for the photoelectric conversion of the output beams received from the first and second optical output ports of the first optical hybrid circuit and the first and second output ports of the second optical hybrid circuit;

a first electrical 90° hybrid circuit, operatively connected to said first and second photodetectors, which is provided with a first electrical input port which receives the output signal of the first photodetector, a second electrical input port which receives the output signal of the second photodetector, and a first electrical output port and a second electrical output port, said first electrical 90° hybrid circuit adding the input signal applied to the first electrical input port to the input signal applied to the second electrical input port after shifting the phase of the input signal applied to the first electrical input port by 90° to obtain an added signal, applying the same added signal to the second electrical output port, and said first electrical 90° hybrid circuit adding the input signal applied to the second electrical input port to the input signal applied to the first input port after shifting the phase of the input signal applied to the second input port by 90° to obtain an added signal and applying the same added signal to the first electrical output port;

a second electrical 90° hybrid circuit, operatively connected to said third and fourth photodetectors, which is provided with a first electrical input port which receives the output signal of the third photodetector, a second electrical input port which receives the output signal of the fourth photodetector, and a first electrical output port and a second electrical output port, said second electrical 90° hybrid circuit adding the signal applied to the first electrical input port to the signal applied to the second electrical input port after shifting the phase of the signal applied to the first electrical input port by 90° to obtain an added signal, applying the same added signal to the second electrical output port, and said second electrical 90° hybrid circuit adding the signal applied to the second electrical input port to the signal applied to the first electrical input port after shifting the phase of the signal applied to the second electrical input port by 90° to provide an added signal and applying the same added signal to the first electrical output port;

first and second equalizers, operatively connected to said first and second electrical 90° hybrid circuits which delay the output signals received from the first electrical output port of the first electrical 90° hybrid circuit and the second electrical output port of the second electrical 90° hybrid circuit by delays respectively corresponding to their frequencies, or delay the output signals received from the second electrical output port of the first electrical 90° hybrid circuit and the output signal received from the first electrical output port of the second electrical 90° hybrid circuit by delays respectively corresponding to their frequencies;

first and second demodulators, operatively connected to said first and second equalizers for demodulating the output signals of the first and second equalizers; and an adder, operatively connected to said first and second demodulator, for adding the output signals of the first and second demodulators.

18. A receiver for coherent optical communication according to claim 17, wherein respective signs of a proportionality constants of the first and second equalizers for determining the delay according to the frequency are the same.

19. A receiver for coherent optical communication according to claim 18, wherein each of the first and second optical hybrid circuits comprises: an optical coupler which adds the signal beam applied to the first optical input port to the local-oscillator beam applied to the second optical input port and branches the added beam to provide branched beams; and a polarizing splitter which splits at least one of the branched beams branched by the optical coupler so that the polarized components of the signal beam and the local-oscillator beam are applied to the first and second optical output ports.

20. A receiver for coherent optical communication according to claim 19, wherein either the signal beam or the local-oscillator beam applied to the first and second optical hybrid circuits is a linearly polarized beam and the other is a circularly polarized beam.

21. A receiver for coherent optical communication according to claim 20, wherein the respective planes of polarization of the linearly polarized beams applied respectively to the first and second optical hybrid circuits are orthogonal, and the respective directions of rotation of the circularly polarized beams applied respectively to the first and second optical hybrid circuits are the same.

22. A receiver for coherent optical communication according to claim 20, wherein the respective planes of polarization of the linearly polarized beams applied respectively to the first and second optical hybrid circuits are parallel, and the respective directions of rotation of the circularly polarized beams applied respectively to the first and second optical hybrid circuits are opposite to each other.

23. A receiver for coherent optical communication according to claim 19, wherein the signal beam and the local-oscillator beam applied to the first and second optical hybrid circuits are elliptically polarized beams having the same phase shift corresponding to the phase difference between the linearly polarized beam and the circularly polarized beam.

24. A receiver for coherent optical communication according to claim 18, wherein each of the first and second optical hybrid circuits comprises: first and second polarizing splitters for splitting the signal beam applied to the first optical input port and the local-oscillator beam applied to the second optical input port so that the polarized components of the signal beam and the local-oscillator beam are provided; and first and second optical couplers which add the output beams having the same plane of polarization provided by the first and second polarizing splitters and apply the added beams to the first and second optical output ports.

25. A receiver for coherent optical communication according to claim 24, wherein either the signal beam or the local-oscillator beam applied to the first and second optical hybrid circuits is a linearly polarized beam and the other is a circularly polarized beam.

26. A receiver for coherent optical communication according to claim 25, wherein the respective planes of polarization of the linearly polarized beams applied to the first and second opitcal hybrid circuits are orthogonal, and the respective directions of rotation of the circularly polarized beams applied to the first and second optical hybrid circuits are the same.

27. A receiver for coherent optical communication according to claim 25, wherein the respective planes of polarization of the linearly polarized beams applied to the first and second optical hybrid circuits are parallel, and the respective directions of rotation of the circularly polarized beams applied to the first and second optical hybrid circuits are opposite to each other.

28. A receiver for coherent optical communication according to claim 24, wherein the signal beam and the local-oscillator beam applied to the first and second optical hybrid circuits are elliptically polarized beams having the same phase shift corresponding to the phase difference between the linearly polarized beam and the circularly polarized beam.

29. A receiver for coherent optical communication comprising:

an optical local oscillator which emits a local-oscillator beam;

an optical hybrid circuit, operatively connected to said optical local oscillator, which is provided with a first optical input port for receiving a signal beam, a second optical input port for receiving the local-oscillator beam, a first optical output port and a second optical output port, said optical hybrid circuit branching the signal beam to produce a first branched signal beam and a second branched signal beam and branching the local-oscillator beam to produce a first branched local oscillator beam and a second branched local-oscillator beam, said optical hybrid circuit producing a predetermined phase shift between the first branched signal beam and the second branched signal beam or between the first branched local-oscillator beam and the second branched local-oscillator beam, and said optical hybrid circuit adding the first branched signal beam and the first branched local-oscillator beam to produce a first added beam and adding the second branched signal beam and the second branched local-oscillator beam to produce a second added beam, and applying the first and second added beams respectively to the first and second optical output ports;

a first photodetector, operatively connected to said optical hybrid circuit, for the photoelectric conversion of a beam received from the first optical output port of the optical hybrid circuit;

a second photodetector, operatively connected to said optical hybrid circuit, for the photoelectric conversion of a beam received from the second optical output port of the optical hybrid circuit;

an oscillator having a fixed frequency;

a first mixer, operatively connected to said first photodetector and oscillator, which adds the output signal of the oscillator with the signal received from the first photodetector;

a second mixer, operatively connected to said second photodetector and oscillator, which adds the output signal of the oscillator with the signal received from the second photodetector;

an electrical 90° hybrid circuit, operatively connected to said first and second mixers, which is provided with a first electrical input port which receives the output signal of the first mixer, a second electrical input port which receives the output signal of the second mixer, and a first electrical output port and a second electrical output port, said electrical 90° hybrid circuit adding the signal applied to the first electrical input port to the signal applied to the second electrical input port after shifting the phase of the signal applied to the first electrical input port by 90° to provide an added signal and applying the same added signal to the second electrical output port, and said electrical 90° hybrid circuit adding the signal applied to the second electrical input port to the signal applied to the first electrical input port after shifting the phase of the signal applied to the second electrical input port by 90° to provide an added signal and applying the same added signal to the first electrical output port;

an equalizer, operatively connected to said electrical 90 degree hybrid circuit which delays the output signal received from the first or second electrical output port by a delay corresponding to its frequency;

a demodulator operatively connected to said equalizer for demodulating the output signal of said equalizer.

30. A receiver for coherent optical communication according to claim 29, wherein the optical hybrid circuit comprises: an optical coupler which adds the signal beam applied to the first opitcal input port to the local-oscillator beam applied to the second optical input port and branches the added beam; and a polarizing splitter which splits at least one of the branched beams branched by the optical coupler so that the respective polarized components of the signal beam and the local-oscillator beam are applied to the first and second optical output ports.

31. A receiver for coherent optical communication according to claim 30, wherein either the signal beam or the local-oscillator beam applied to the optical hybrid circuit is a linearly polarized beam and the other is a circularly polarized beam.

32. A receiver for coherent optical communication according to claim 30, wherein the signal beam and the local-oscillator beam applied to the optical hybrid circuit are elliptically polarized beams having the same phase shift corresponding to the phase difference between the linearly polarized beam and the circularly polarized beam.

33. A receiver for coherent optical communication according to claim 29, wherein the optical hybrid circuit comprises: first and second polarizing splitters for splitting the signal beam applied to the first optical input port and the local-oscillator beam applied to the second optical input port so that the polarized components of the signal beam and the local-oscillator beam are provided; and first and second optical couplers which add the output beams having the same plane of polarization provided by the first and second polarizing splitters and applying the added beams to the first and second optical output ports.

34. A receiver for coherent optical communication according to claim 33, wherein either the signal beam or the local-oscillator beam applied to the optical hybrid circuit is a linearly polarized beam and the other is a circularly polarized beam.

35. A receiver for coherent optical communication according to claim 33, wherein the signal beam and the local-oscillator beam are elliptically polarized beams having the same phase shift corresponding to the phase difference between the linearly polarized beam and the circularly polarized beam.

* * * * *